United States Patent [19]
Abramson et al.

[11] Patent Number: 5,717,882
[45] Date of Patent: Feb. 10, 1998

[54] METHOD AND APPARATUS FOR DISPATCHING AND EXECUTING A LOAD OPERATION TO MEMORY

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland; David B. Papworth, both of Beaverton; Michael A. Fetterman, Hillsboro, all of Oreg.

[73] Assignee: Intel Corporation, Santa Clara, Calif.

[21] Appl. No.: 764,643

[22] Filed: Dec. 11, 1996

Related U.S. Application Data

[63] Continuation of Ser. No. 202,425, Feb. 28, 1994, abandoned, which is a continuation-in-part of Ser. No. 177,164, Jan. 4, 1994.

[51] Int. Cl.[6] ............................................. G06F 9/00
[52] U.S. Cl. ................................. 395/393; 395/800
[58] Field of Search .......................... 395/393, 712, 395/800

[56] References Cited

U.S. PATENT DOCUMENTS

| | | | |
|---|---|---|---|
| 5,261,071 | 11/1993 | Lyon | 395/425 |
| 5,404,470 | 4/1995 | Miyake | 395/375 |
| 5,463,745 | 10/1995 | Vidwans et al. | 395/375 |
| 5,519,864 | 5/1996 | Martell et al. | 395/650 |
| 5,557,763 | 9/1996 | Senter et al. | 395/800 |
| 5,613,080 | 3/1997 | Ray et al. | 395/800 |
| 5,630,157 | 5/1997 | Dwyer, III | 395/800 |

OTHER PUBLICATIONS

Popescu, Val; Schultz, Merle; Spracklen, John; Gibson, Gary; Lightner, Bruce; Isaman, David, "The Metaflow Architecture", IEEE Micro, Jun. 1991, pp. 10–13 and 63–73.
Johnson, Mike; *Superscalar Microprocessor Design*; Prentice Hall, Inc., New Jersey, 1991.

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

A method and apparatus for performing operations with a processor in a computer system. Load operations are performed by use of a dispatch pipeline and a memory execution pipeline. The dispatch pipeline dispatches the load operation for execution by the processor, while the memory execution pipeline controls the execution of the load operation to memory. The present invention reduces the latency involved in executing a load operation by coupling the execution of the two pipelines during execution of the load operation.

34 Claims, 19 Drawing Sheets

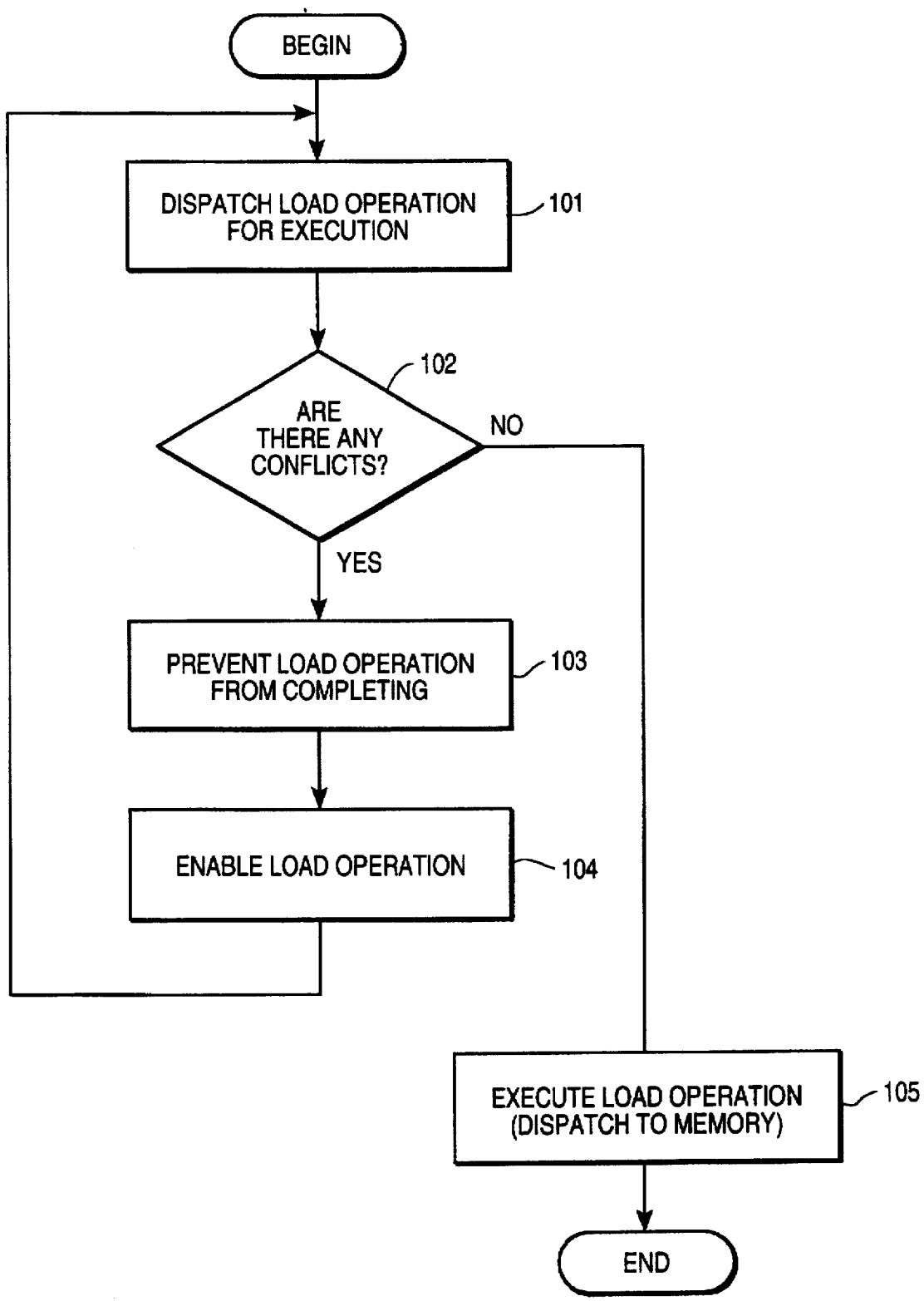
FIG_1

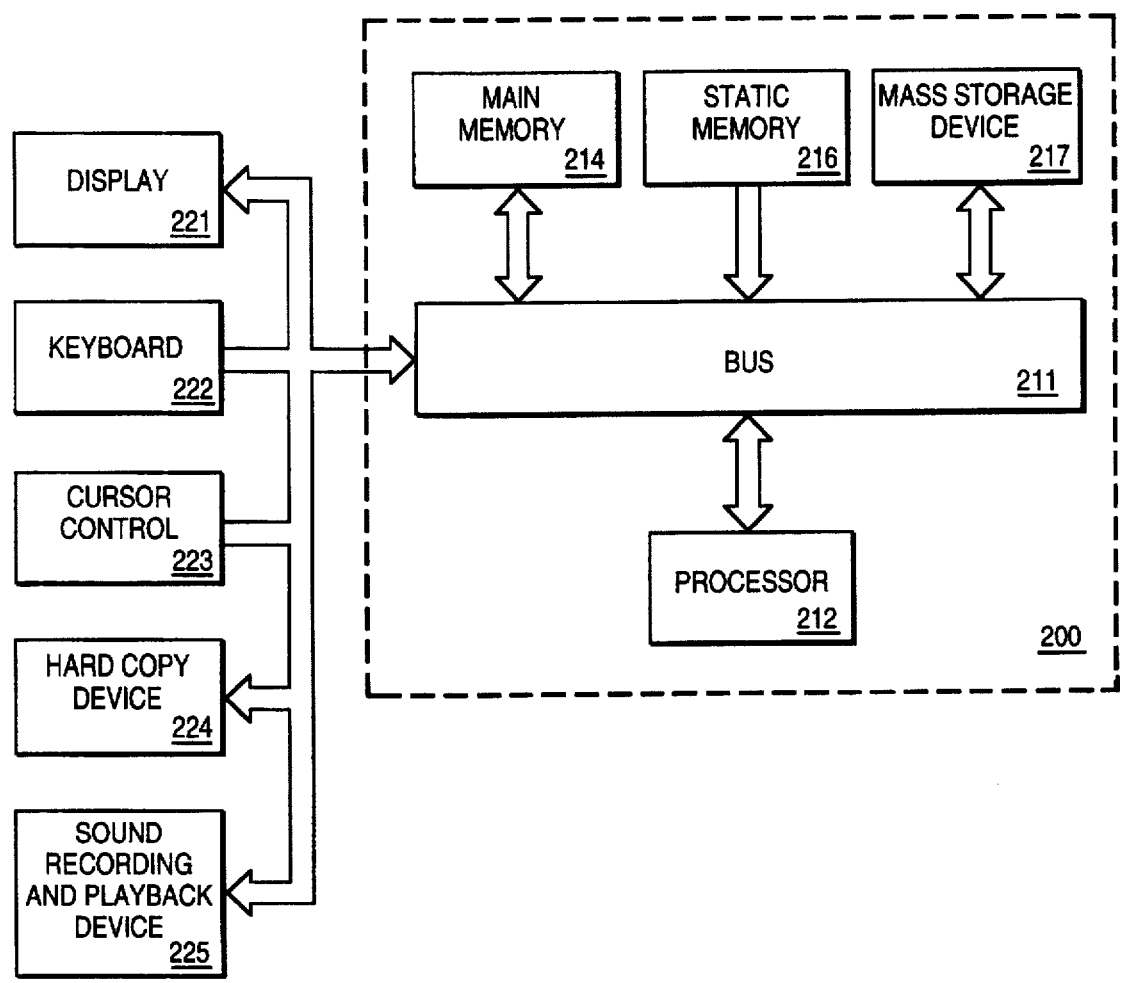
FIG_2A

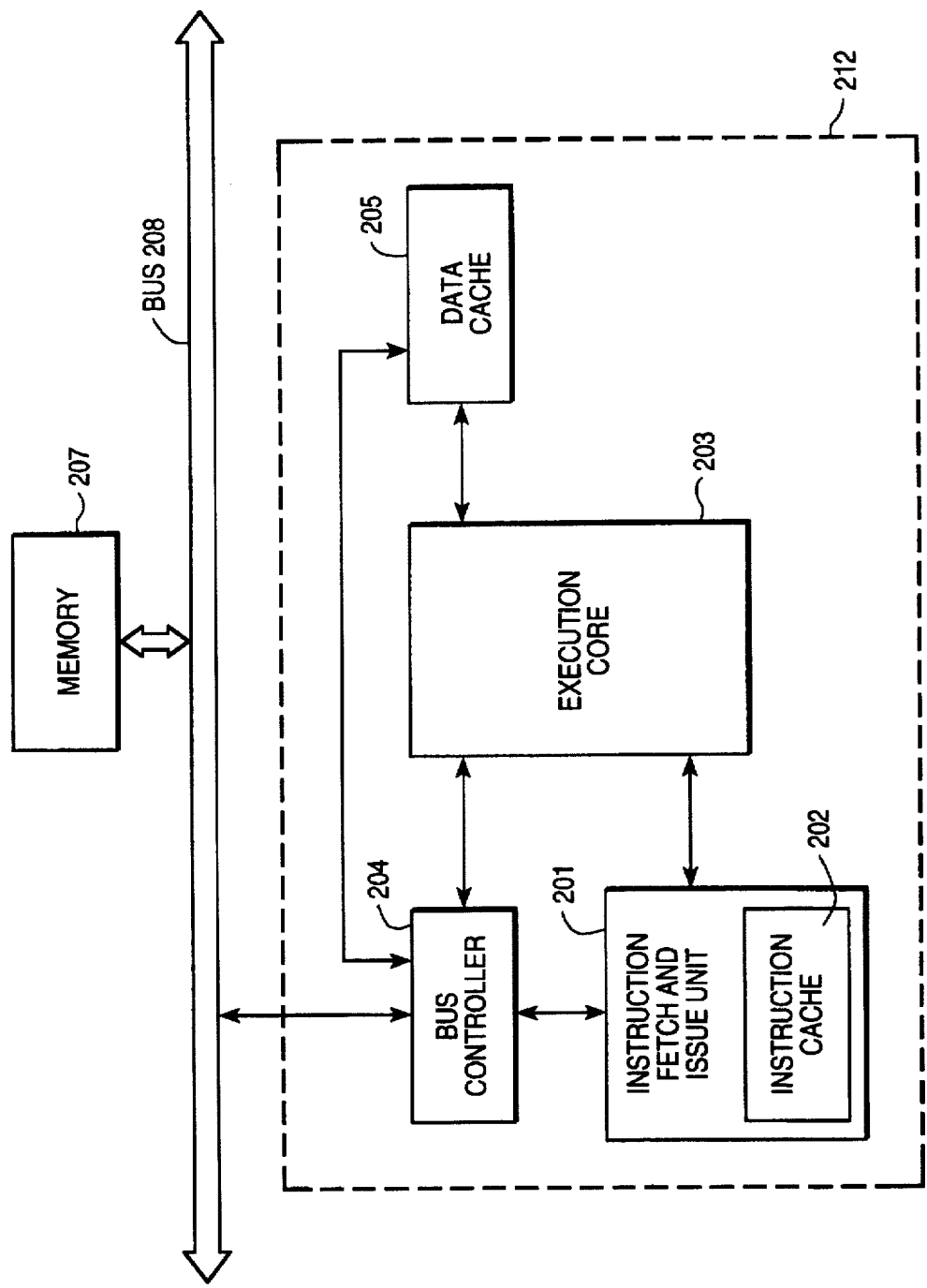

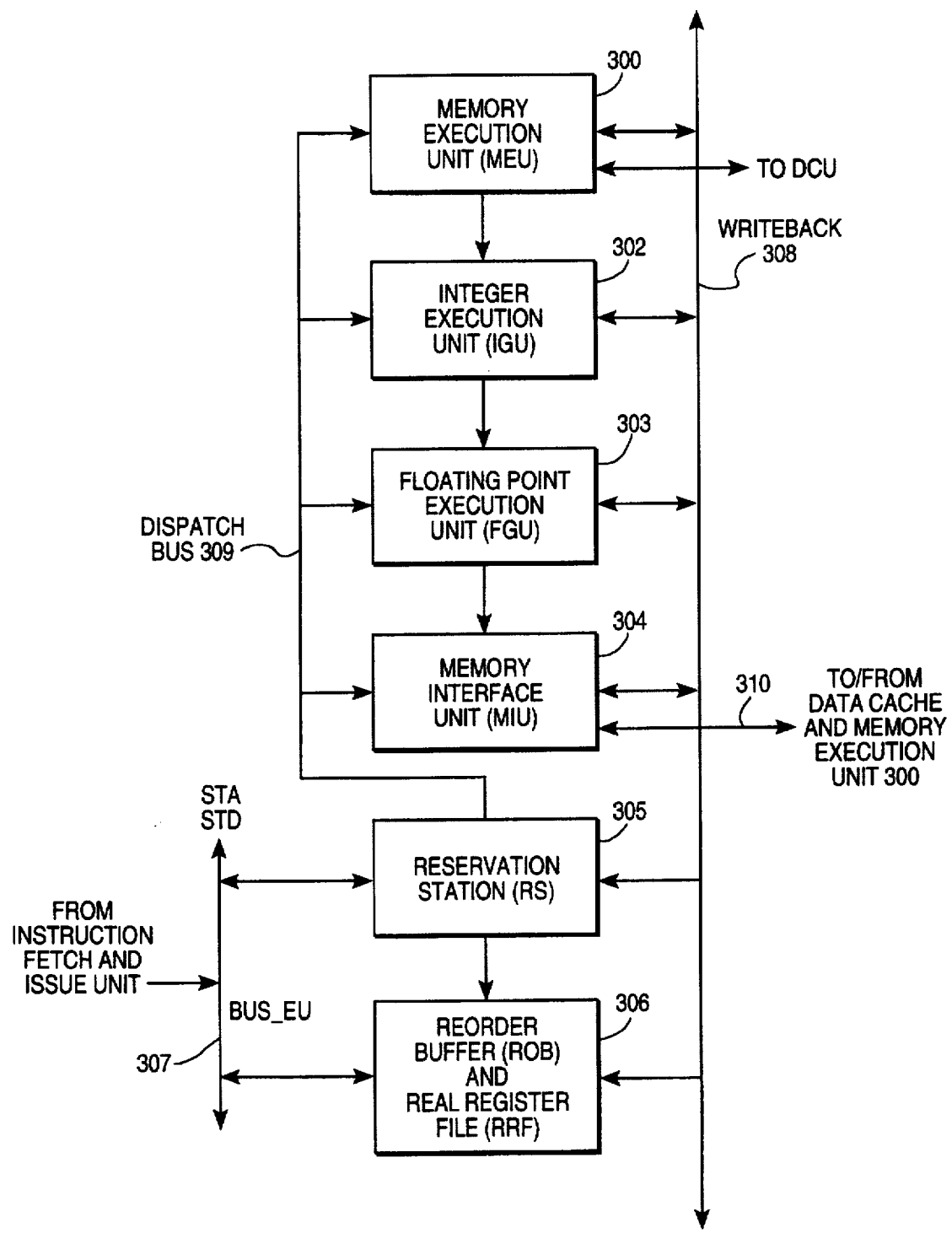
FIG_3

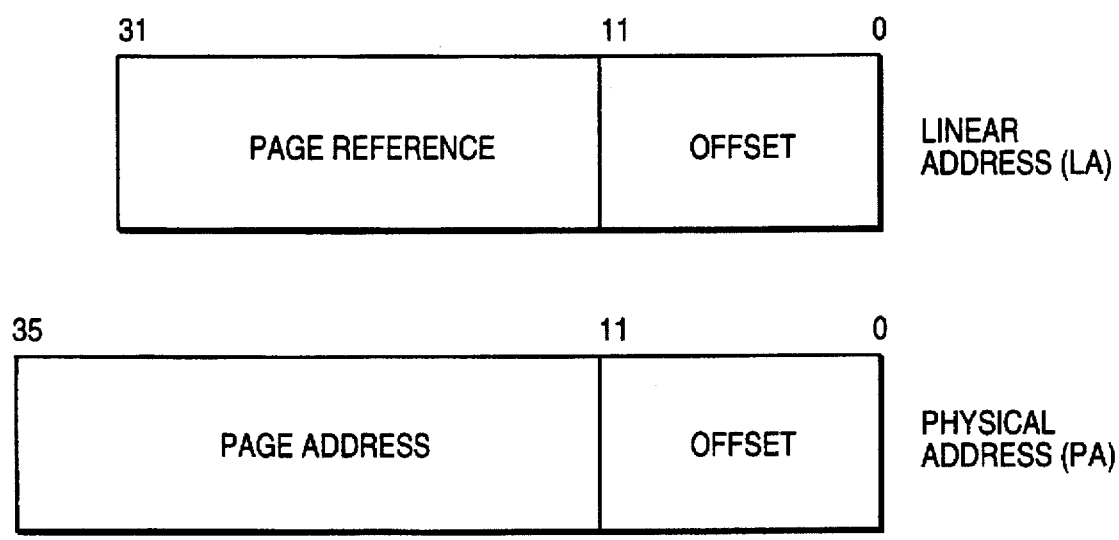
FIG_4

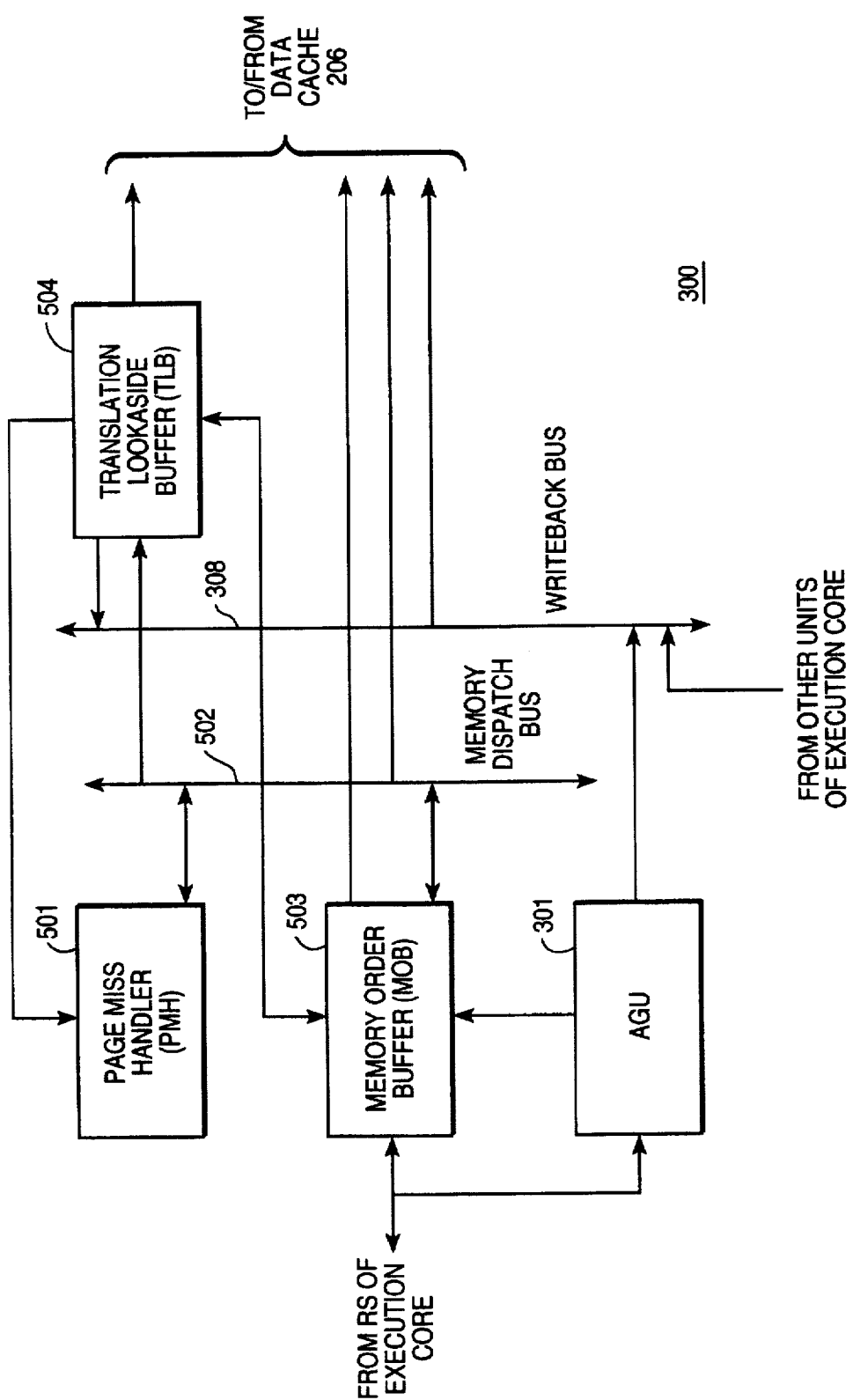
FIG_5

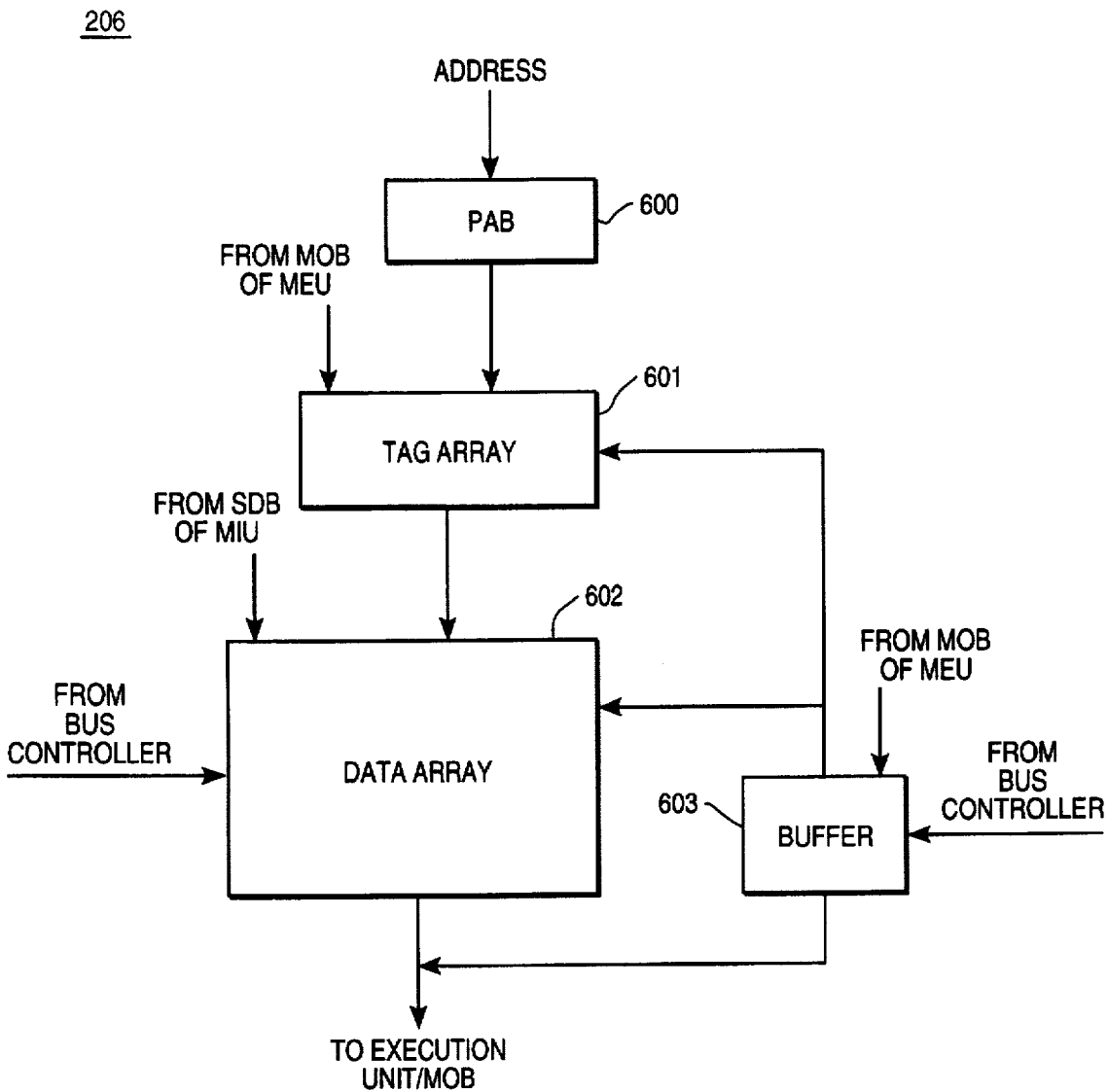
FIG_6

FIG_9

FIG_10

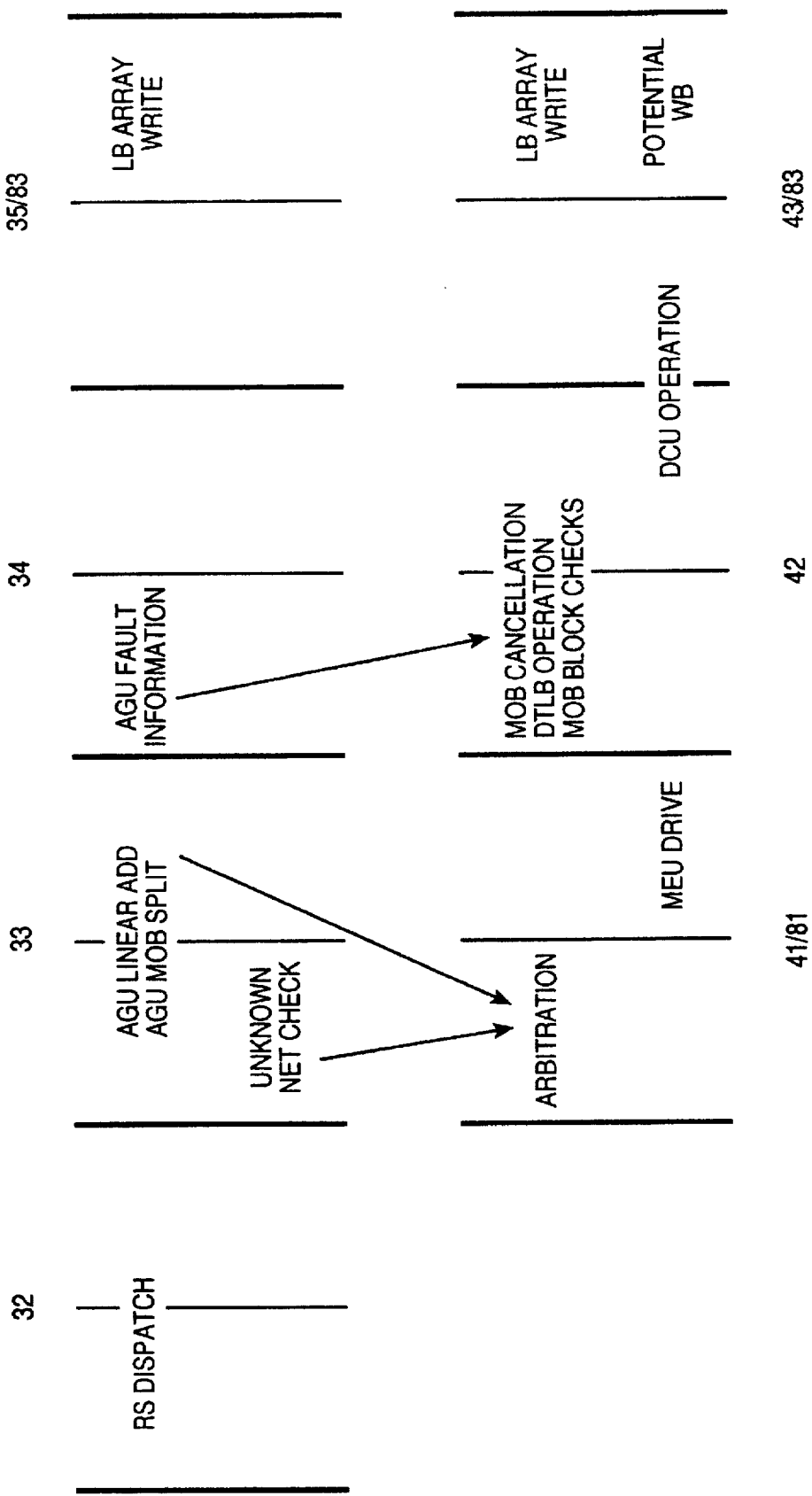
FIG_12

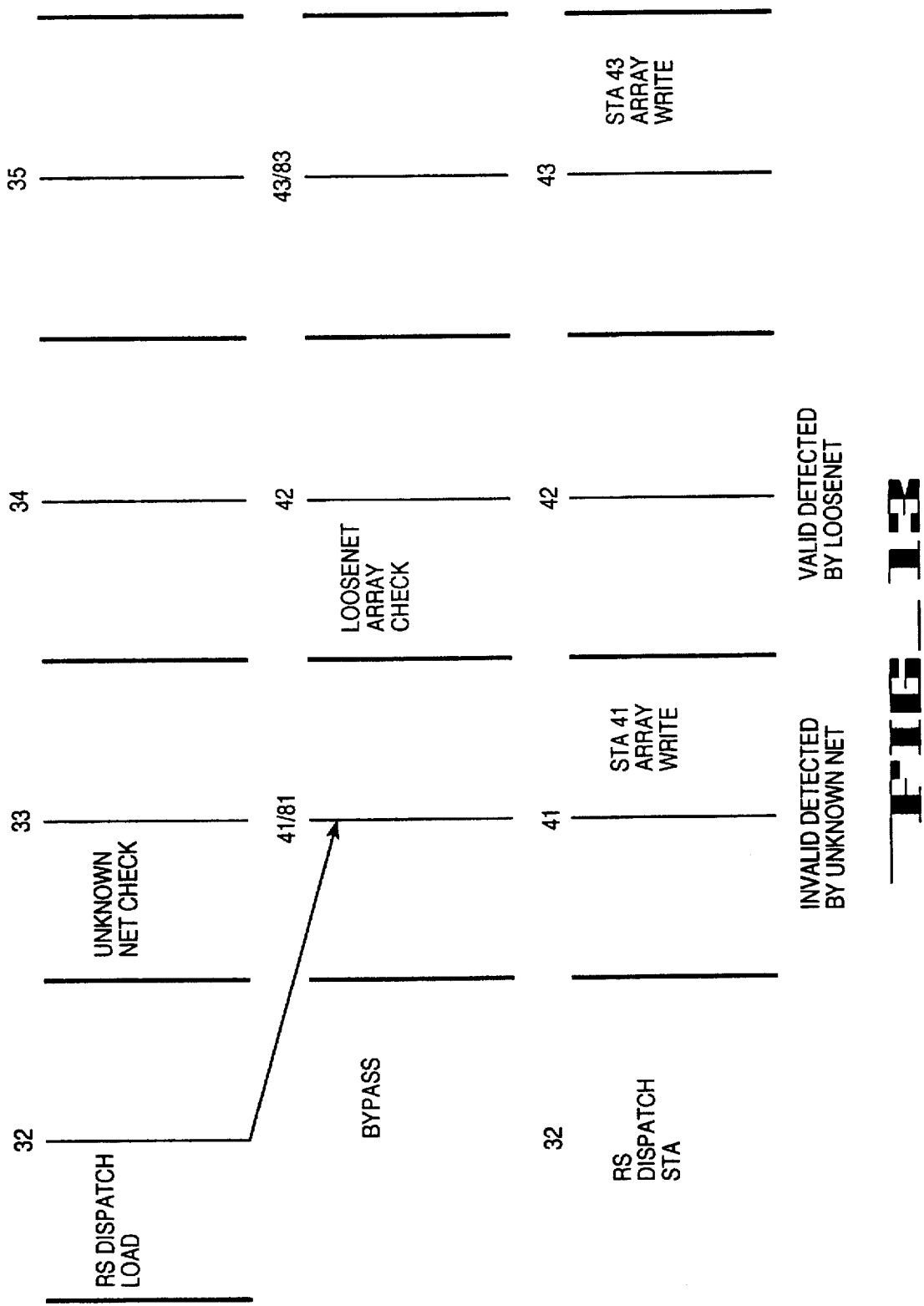

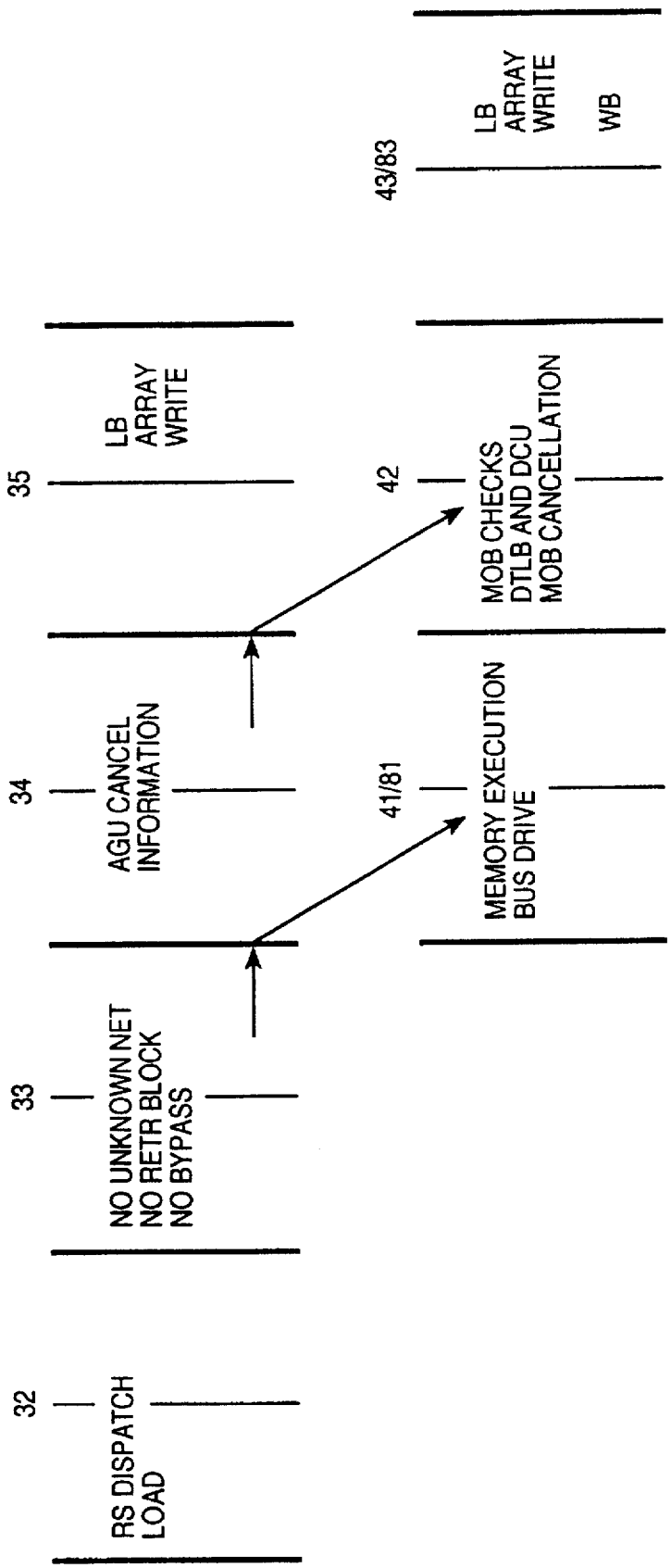
FIG_14

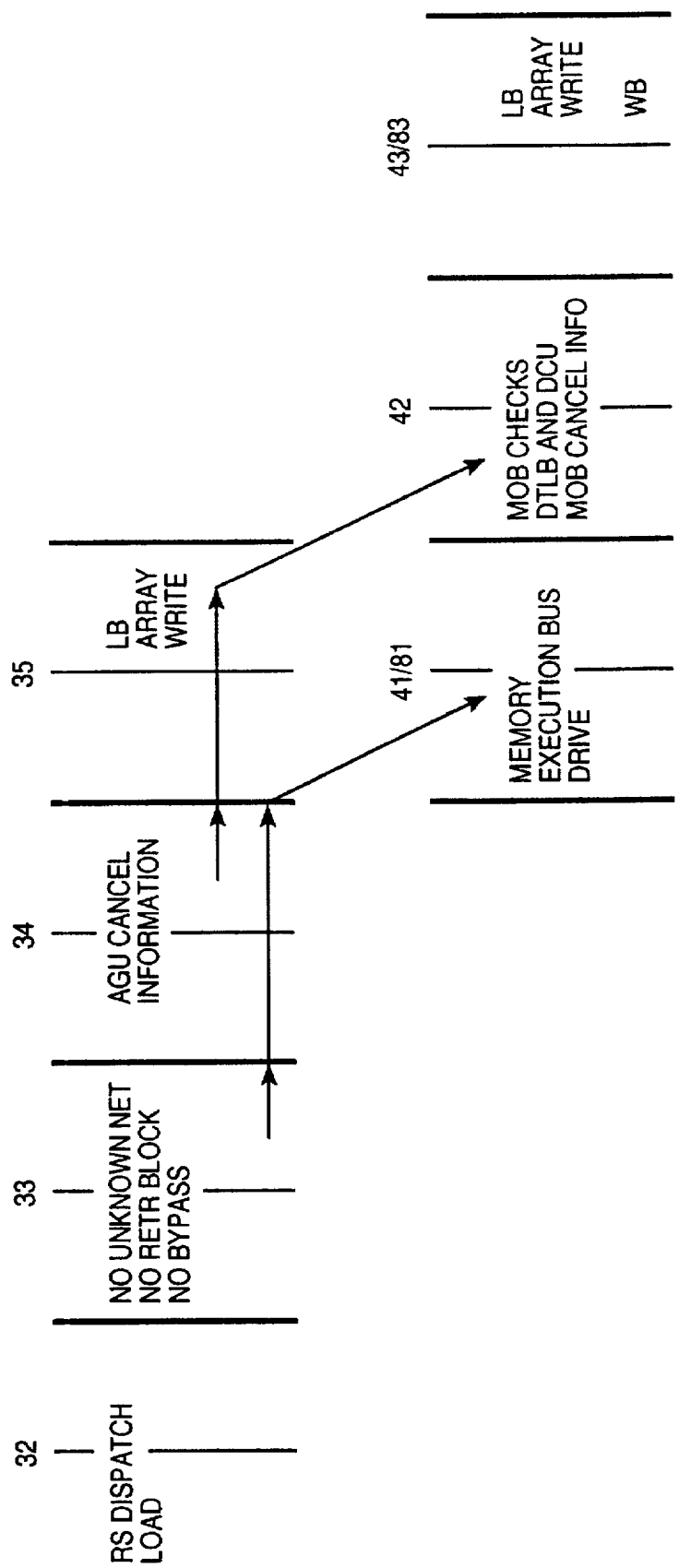

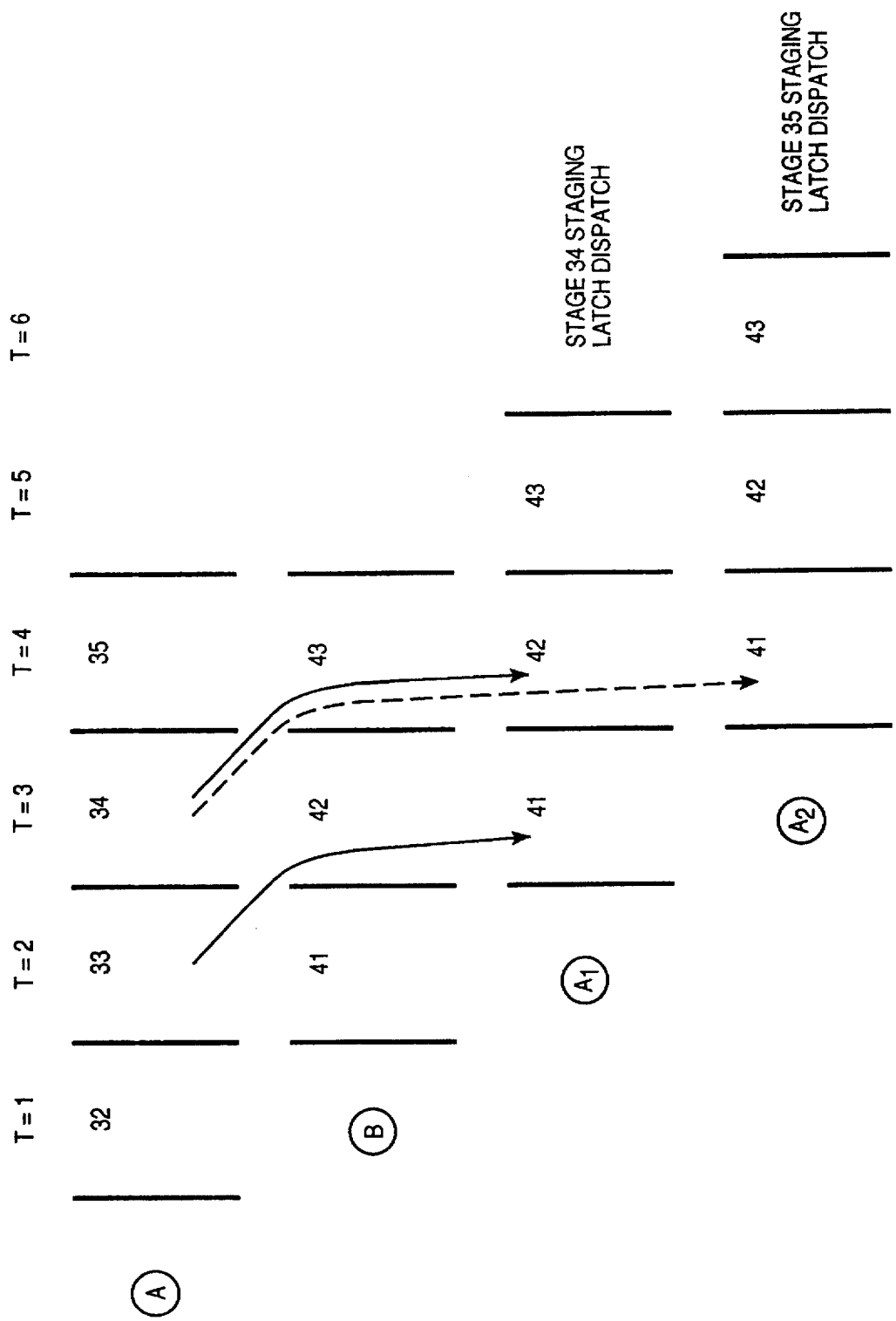
FIG_16

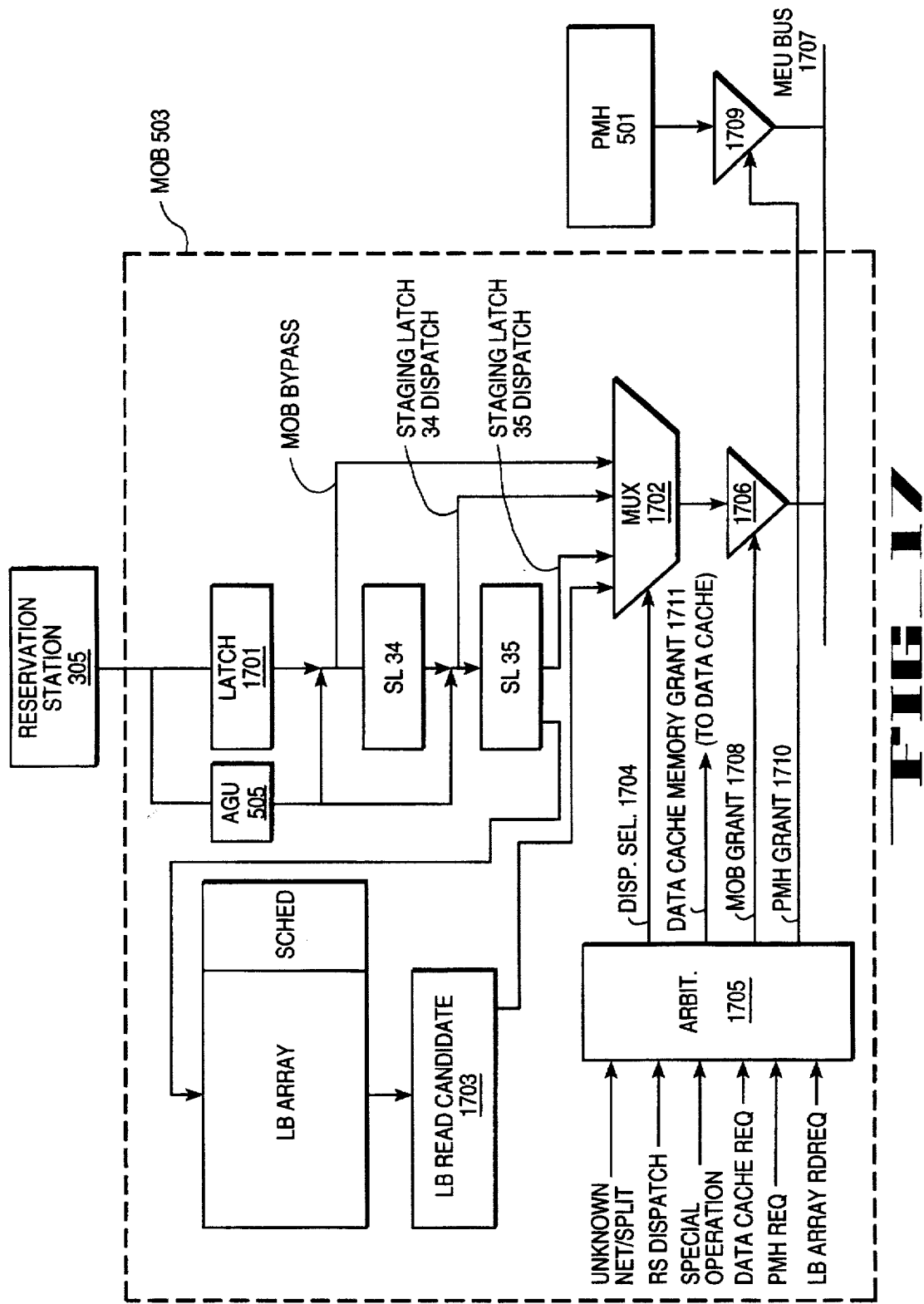

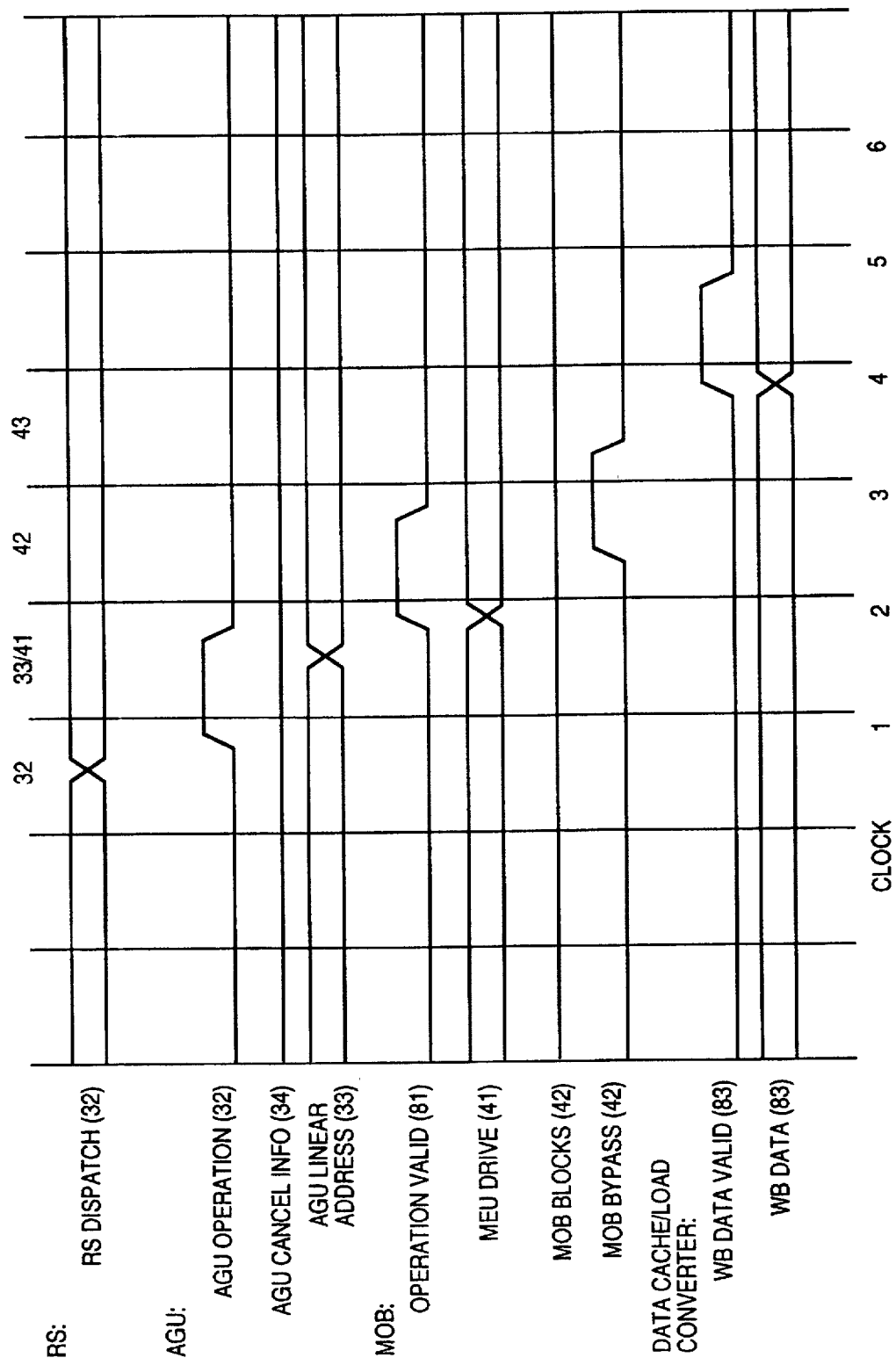

000
METHOD AND APPARATUS FOR DISPATCHING AND EXECUTING A LOAD OPERATION TO MEMORY

This is a continuation of application Ser. No. 08/202,425, filed Feb. 28, 1994, now abandoned, which is a continuation-in-part application of U.S. patent application Ser. No. 08/177,164, entitled "Method and Apparatus for Performing Load Operations in a Computer System," filed Jan. 4, 1994.

FIELD OF THE INVENTION

The present invention relates to the field of computer systems; more particularly, the present invention relates to dispatching and executing load operations in a computer system.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the amount of data that is desired. Using the address and the amount of data specified, the memory may be accessed and the desired data obtained.

The memory accessed in response to the load instruction may be the main system memory. Besides including a main system memory, many of today's memory systems also include a cache memory. A cache memory is a very fast local storage memory that is used by a CPU to hold copies of instructions, code or data that are frequently requested from the main memory by the CPU. Memory caches are commonly designed at two levels: a first level cache memory and a second level cache memory. Most recently, the use of third level cache memories has been discussed. The first level cache memory is usually integrated on the same integrated circuit die with the CPU, while the second and third level caches are typically integrated in separate dies, often separate chips. If the memory system includes cache memories, the cache memories are accessed before the main system memory in order to fulfill a load request.

Some computer systems have the capabilities to execute instructions out-of-order. In other words, the CPU in the computer system is capable of executing one instruction before a previously issued instruction. This out-of-order execution is permitted because there was no dependency between the two instructions. That is, a subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and its relationship with speculative execution of instructions is well-known in the art. For a detailed explanation of speculative out-of-order execution, see M. Johnson, *Superscalar Microprocessor Design*, Prentice Hall, 1991. Speculative and out-of-order execution offer advantages over the prior art, including better use of resources. If multiple instructions are permitted to be executed at the same time, this performance benefit greatly increases.

Special considerations exist with respect to performing memory operations out-of-order in a computer system. Memory operations are ordered to ensure that the correct data is being transferred. For instance, if a store operation and a load operation have the same destination and source addresses respectively and the store operation precedes the load operation in the instruction stream, then the store operation must occur before the load operation to ensure the correct data will be subsequently loaded. If the load operation is allowed to be completed before the store operation, then the data loaded would more than likely not be the data that the store operation would have stored at the memory location. By using stale data, the computer system will not function as intended by the ordered sequence of instructions. However, out-of-order and concurrent execution of instructions may be very beneficial. Thus, it would be advantageous to execute memory operations out-of-order and concurrently except where their execution would create incorrect results.

Many of today's systems execute instructions in a pipelined manner, irrespective of an out-of-order nature. A typical instruction is performed by going through a number of different pipestages. During each stage, a distinct part of the execution of an instruction occurs. In the case of a load instruction, it's address may be calculated in one stage, while the size of the transfer determined in another stage. The dispatching of the load operation to memory may occur in yet another pipestage, as well as a determination by a coordinating device (e.g., a CPU) as to whether the load operation may be performed without causing memory ordering problems or whether the memory system may accommodate such a load operation.

One problem with pipeline implementations is that an instruction must undergo each stage regardless of whether or not the operation performed in a particular stage is required to complete the execution of the instruction. If the instruction is a load operation, multiple pipestages may have to occur before the load operation may be dispatched to the memory subsystem even though the instruction is ready for dispatch. Because the processor may be waiting for data, this extra delay may hurt overall performance. Thus, it is desirable to be able to execute a load operation to memory when the memory subsystem is available.

SUMMARY OF THE INVENTION

The present invention includes a method and apparatus for executing a memory operation. The present invention includes a method and apparatus for dispatching the operation to the memory subsystem when data dependencies no longer prevent execution of the operation. The result of the dispatching is that the operation begins execution in a first pipeline responsible for dispatching the operation to the memory subsystem of the processor. The present invention also includes a method and apparatus for bypassing the operation from the memory subsystem to a memory for execution during a clock cycle subsequent to the dispatching of the operation and prior to buffering the operation. This results in the execution of the operation by a second pipeline, which executes the operation to memory when the operation is a load operation. In this manner, the first pipeline and the second pipeline are performed concurrently, such that they are overlapped in the execution of the operation.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a flow diagram illustrating the process of the present invention.

FIG. 2A is a block diagram of the computer system of the present invention.

FIG. 2B is a block diagram of the memory subsystem of the present invention.

FIG. 3 is a block diagram of one embodiment of the execution unit of the present invention.

FIG. 4 illustrates an example of one embodiment of the addressing scheme of the present invention.

FIG. 5 is a block diagram of the relevant portions of the cache controller of the present invention.

FIG. 6 is a block diagram of the relevant portions of the data cache of the present invention.

FIG. 12 illustrates one embodiment of a MOB bypass according the present invention.

FIG. 13 illustrates an example of a MOB bypass according to the present invention.

FIG. 14 illustrates one embodiment of a staging latch dispatch according to the present invention.

FIG. 15 illustrates another embodiment of a staging latch dispatch according to the present invention.

FIG. 16 illustrates a pipeline diagram of an example of the staging latch dispatches according to the present invention.

FIG. 17 illustrates one embodiment of the mechanism for bypassing and executing a load operation into memory.

FIG. 18 is a timing diagram of a MOB bypass.

DETAILED DESCRIPTION OF THE PRESENT INVENTION

Figure 7:
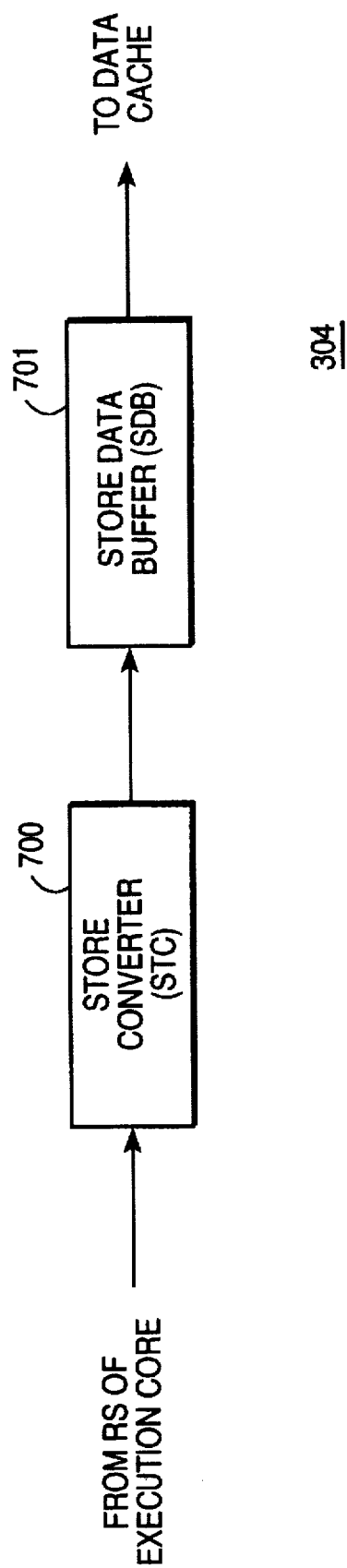
FIG. 7 is a block diagram of the relevant portions of memory interface unit of the present invention.

A method and apparatus for performing load operations is described. In the following detailed description of the present invention numerous specific details are set forth, such as specific number of bits, address sizes, blocking conditions, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention includes a process and mechanism for performing load operations. The present invention performs the load operations in response to load instructions executed in the computer system. The load instructions are received and executed by a processor in the computer system. In performing the load operations, the present invention insures that there are no memory ordering violations, even though these operations may be performed out-of-order.

The process for performing a load operation in the present invention is depicted in the flow diagram of FIG. 1. Referring to FIG. 1, the load operation is initially dispatched into the memory subsystem for execution in the computer system (processing block 101). In the present invention, this dispatch occurs when there are no data dependencies on the load. A test then determines whether there are any conflicts (other than data dependency conflicts) that might exist between the load operation and previously dispatched store operations which could possibly result in incorrect data being loaded into the processor as a result of the execution of the load (processing block 102). The present invention provides several mechanisms for detecting when conflicts arise, such that speculative execution may be used as much as possible. In the present invention, these conflicts may be due to address dependencies where the source address of the load operation may be the same as a destination address of one of the currently dispatched, yet not completed, store operations. The present invention is able to track address dependencies between load and store operations by assigning an identification to each load operation to identify its relative temporal position with respect to the sequential stream of store operations. Using the identification, the present invention identifies the set of store operations, if any, that potentially conflict with the load operation. Address dependencies may also include split accesses, where the address to a portion of the split access is the same. The present invention also identifies conflicts due to resource dependencies. Resource dependencies exist when a resource required for execution of the load operation is currently in use or unavailable for one of a number of reasons, such that the load operation cannot gain control of the resource for its execution. Such resource conflicts may occur when the data cache memory (L1 cache memory, L2 cache memory, etc.), the page misshandler, or the translation lookaside buffer are busy.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data.

Overview of the Computer System of the Present Invention

Referring to FIG. 2A, the computer system upon which a preferred embodiment of the present invention is implemented is shown as 200. Computer system 200 comprises a bus or other communication means 211 for communicating information, and a processing means 212 coupled with bus 211 for processing information. Processor 212 includes, but is not limited to microprocessors such as an Intel Architecture Microprocessor, manufactured by Intel Corporation of Santa Clara, Calif., the corporate assignee of the present invention. Processor 212 may also be another microprocessor such as the PowerPC™, Alpha™, etc. System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

FIG. 2B is a block diagram of the memory subsystem of the computer system of the present invention. Referring to FIG. 2B, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 212 (FIG. 2A). In the present invention, elements 201-205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The bus controller 204 manages transfers of data between external components and the processor 212. In addition, bus controller 204 manages cache coherency transfers. The fetched instructions are stored in instruction cache memory 202. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 205 responds to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffered stores of mispredicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating the teachings of the present invention, and the data cache memory 205, will be described further in detail below with additional references to the remaining figures.

FIG. 3 is a block diagram of one embodiment of the execution core of the present invention. Referring to FIG. 3, execution core 203 comprises a reservation station (RS) 305, a memory execution unit MEU 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, AGU 505, IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station (RS) 305 receives and stores the issued instructions resolving their operands with data from the IEU 302, the FEU 303, the data cache memory, and the ROB and RRF 306 and holds them until their operands are all resolved. The RS 305 then dispatches the issued instructions to the IEU 302, the FEU 303 and the MIU 304 and the MEU 300 (including its AGU) as appropriate.

In particular, a load instruction is dispatched as a single operation, whereas a store instruction is dispatched as store address (STA) and store data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

In response to the dispatched operations, the MEU 300, the IEU 302, FEU 303, and the MIU 304 perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

FIG. 5 depicts a block diagram of the relevant portions of one embodiment of the memory execution unit (MEU) of the present invention. Referring to FIG. 5, the MEU 300 includes AGU 505, page miss handler 501, memory order buffer (MOB) 503, and translation lookaside buffer (TLB) 504, as well as memory dispatch bus 502 and the writeback bus 308. PMH 501 is coupled to the memory dispatch bus 502, writeback bus 308, and TLB 504. MOB 503 is coupled to the reservation station 305, memory dispatch bus 502, writeback bus 308, the data cache memory 205 and TLB 504. TLB 504 is also coupled to memory dispatch bus 502, writeback bus 308 and the data cache memory 205. Memory dispatch bus 502 and writeback bus 308 are also coupled to the data cache memory 205. AGU 505 is coupled to MOB 503, the writeback bus 308, and the dispatch bus 309.

The AGU 505, MOB 503, PMH 501, and TLB 504 control all load accesses to the data cache memory and, in turn, the memory of the computer system. The AGU 505, MOB 503, PMH 501, and TLB 504 also execute the STA portion of the store. Specifically, MOB 503 buffers the results of the STA execution for the eventual store dispatch to the data cache memory 205.

The AGU 505 generates the appropriate linear address for the memory operations. The AGU 505 computes the linear address using a base address, a displacement value, a scale value, an index value and a segment value. In one embodiment, the linear address is 32-bits long with a 20 higher order bits identifying a memory page and the 12 low order bits identifying the offset within the memory page. An example of such an addressing scheme is shown in FIG. 4.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions.

The MOB 503, incorporated with the teachings of the present invention, controls dispatching, buffers all store and load operations, tracks their progress as they proceed through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches blocked operations when the blocking source is removed. Some memory operations cannot execute speculatively, MOB 503 controls the necessary monitoring and dispatches these non-speculative operations at the correct time when they are no loner considered speculative.

The TLB 504 and the PMH 501 are intended to represent a broad category of these elements found in most computer systems. MOB 503 will be described in further detail below with additional references to the remaining figures.

FIG. 6 is a block diagram of one embodiment of the data cache memory of the present invention. Referring to FIG. 6, the data cache memory 206 comprises a physical address buffer (PAB) 600, data tag array 601 and a data array 602 and queue 603. PAB 600 is coupled to receive an input (e.g., the physical address) from the TLB 504 of the MEU 300 and is coupled to produce physical address to tag array 601. Tag array 601 is coupled to receive inputs (e.g., either store address or load address) from the MOB 503 of the MEU 300. Data array 602 is coupled to receive an input from tag array 601 and the store data buffer (SDB) of the MEU 300, as well as being coupled to the bus controller. In response, data array 602 produces an output to the execution core. Queue 603 is also coupled to tag array 601 and data array 602. Queue 603 is also coupled to receive an input from the MOB 503 as well as the bus controller.

The PAB 600 receives and saves the 24 high order bits of the translated physical addresses from the TLB 504 of the MEU 300 for the store and load operations, and in cooperation with the MOB 503 and MIU 304, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB 503 of the MEU 300, will be discussed in further detail below. Tag array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

FIG. 7 is a block diagram of one embodiment of the relevant portions of the MIU of the execution core of the present invention. Referring to FIG. 7, the MIU 304 comprises a store converter (STC) 700 and a store data buffer (SDB) 701, coupled to each other, such that store converter 700 receives data from the reservation station 305 of the execution core 203 and sends data to SDB 701. SDB 701 then sends the data onto the data cache memory 205.

The STC 700 converts the floating point data of the STD operations. The SDB 701 receives and stores the STD operations and in cooperation with the store address buffer (SAB) of the MEU 300, and the PAB 600 of the data cache memory 205, retires/commits the STD operations as appropriate, and causes them to be executed. The functions and constitutions of the STC 700 are well-known and will not be further described. SDB 701 and its cooperation with the SAB and PAB, will be described in further detail below.

Figure 8:
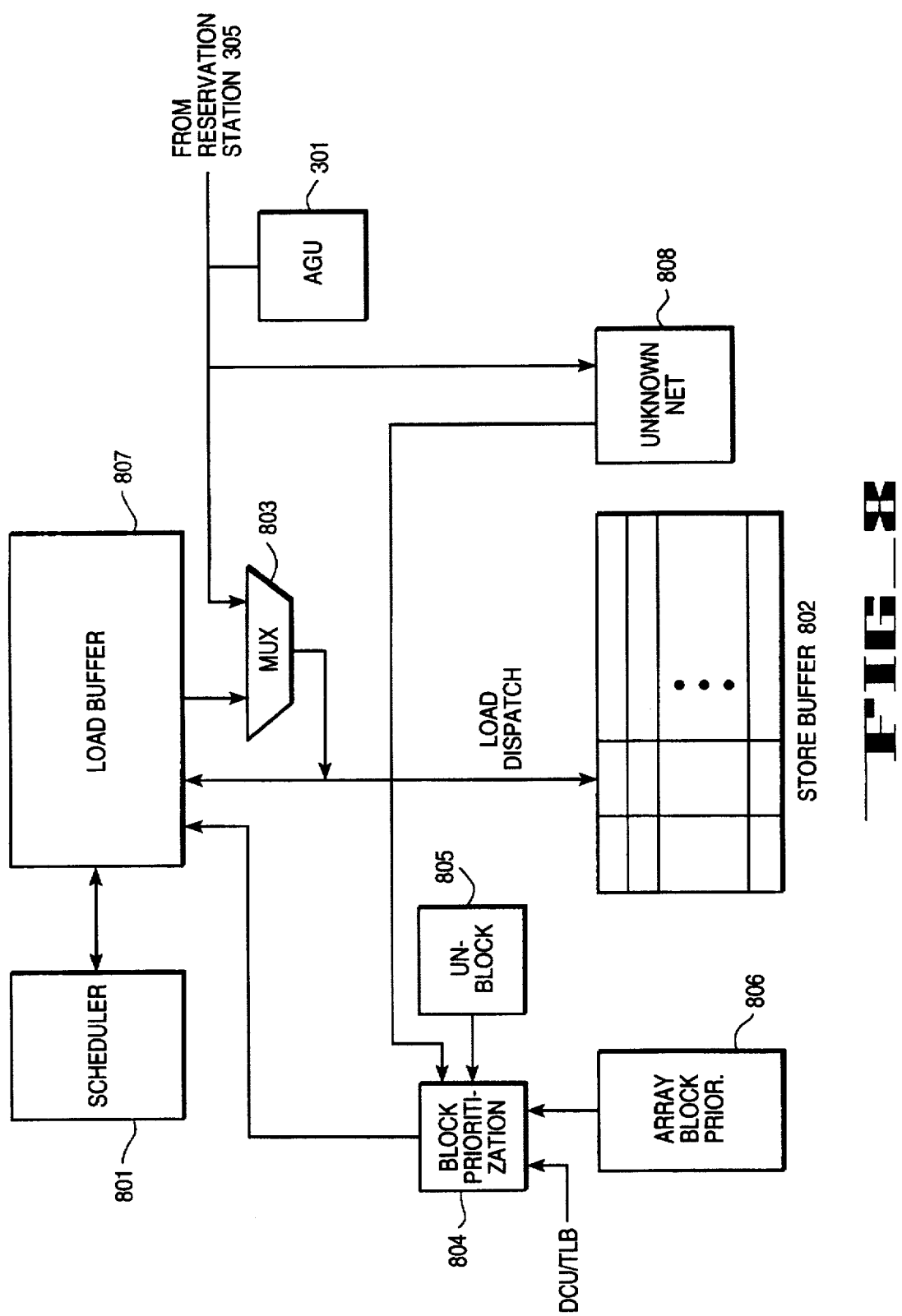
FIG. 8 is a block diagram of the relevant portions of the memory order system of the present invention.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory 205, retires/commits the STA operations as appropriate, and causes them to be dispatched.

LB 807 also is coupled to receive a copy of the load operations dispatched form the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

Figure 9:
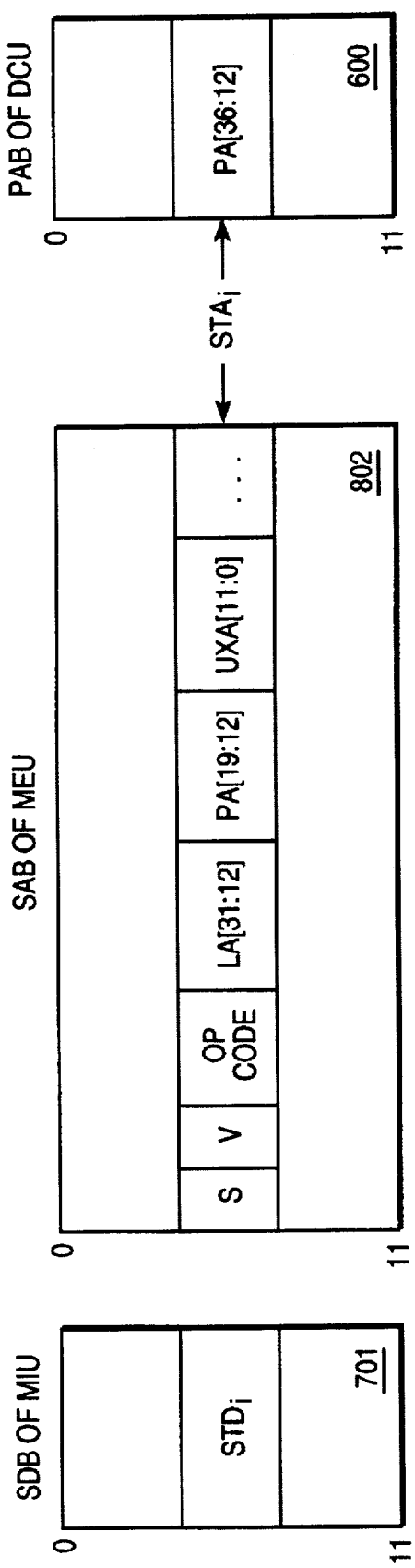
FIG. 9 is a block diagram depicting the interaction between the store address buffer the store data buffer and the physical address buffer.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[9:12]) of the STA operation are replicated in the buffer slot in the SAB 802.

The STD and STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Load Operations

In the present invention, a load operation is performed in response to a load instruction. The load instruction is received by the instruction fetch and issue unit which decodes the load instruction. The issue and fetch unit sends the decoded load operation to the reservation station for dispatch to the memory subsystem when any data dependencies between the load operation and other microoperations are resolved.

Once in the memory subsystem, the linear address for the load can be either bypassed directly from the AGU or can come from the MOB load buffer. The upper 20 bits of the linear address are translated by the DTLB into a physical address. The data cache memory uses these physical address bits along with the lower 12 bits of the untranslated address to do a tag array look-up and data array read (if needed). If the load hits the cache memory, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory, a request for data will be made to the bus controller. After the data is retrieved by the bus controller, either from an L2 cache memory or external memory, the data cache memory requests a cycle on the writeback bus to return the requested data. When the data cache memory has received a grant for a cycle or the writeback bus, it forwards its data to the load converter which drives it on the writeback bus after format conversion.

When performing load operations in the present invention, the load operation is dispatched for execution to the memory subsystem. Once a load operation has been dispatched, the data cache memory and the DTLB begin providing a blocking status, while the MOB detects one or more address conflicts. Using the blocking status condition and the address conflict information, the MOB prioritizes the conditions and conflicts to determine if the load operation should be allowed to continue execution. If the load cannot be completed due to a conflict, it is halted, or blocked. That is, the DCU aborts the load request. In this case, the MOB creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle. The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load currently executing in the system. When the appropriate data is returned, the load operation will wake up and be redispatched. Once redispatched, the load may be blocked, or may complete with returned data.

The load operations that are blocked are stored in the load buffer. In one embodiment, the load buffer contains sixteen entries. Therefore, at most 16 load operations can be pending in the processor at any one time. As many as 16 load operations may "wake up" in a given cycle. Since only one load is dispatched every cycle (in the preferred embodiment), the MOB must queue the load operations that are awake for dispatch. Queuing is performed by the load buffer by tagging loads as "ready" when they wake up. The load buffer then schedules for dispatch one of the "ready" loads each cycle. This ready/schedule mechanism allows the throughput of one load scheduled per cycle.

Thus, the memory of the system is organized such that it receives the loads dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be blocked no longer exist. At this time, the load is allowed to redispatch. For more information on blocking and wakeup of load operations, see co-pending patent application, Ser. No. 08/177,164, entitled "Method and Apparatus for Performing Load Operations in a Computer System," filed Jan. 4, 1994, assigned to the corporate assignee of the present invention and incorporated by reference herein.

Pipelined Load Execution

Figure 10:
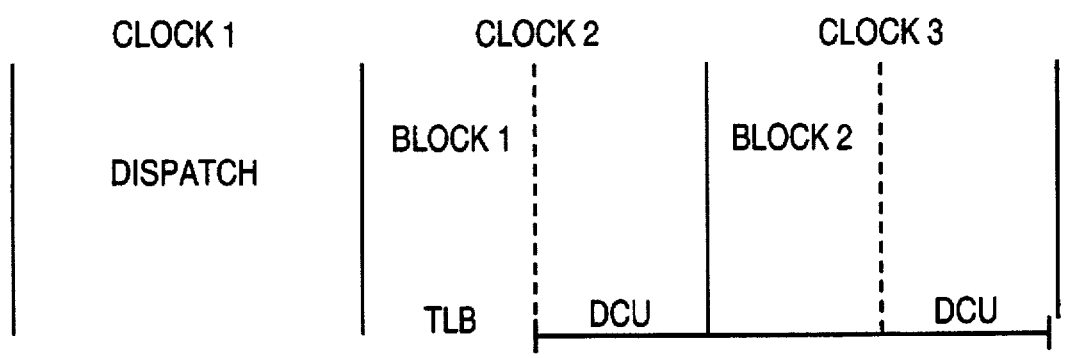
FIG. 10 is a timing diagram of the execution of a load operation according to the present invention.

In one embodiment, the memory execution model is a three stage pipeline. The pipeline is shown in FIG. 10. Referring to FIG. 10, a load operation enters the execution pipeline in the first clock cycle when it is dispatched by the reservation station. In the second cycle of the execution pipeline, some blocking checks (BLOCK1) are performed as well as the TLB access. In performing its access, the TLB supplies information to the data cache memory and the data cache memory begins its memory cache lookup. In the third cycle, the remainder of the blocking checks (BLOCK2) are completed. The blocking checks from the second cycle are grouped into one set with the blocking checks performed in the third cycle to produce status bits that indicate whether the load is to be blocked. Also in the third cycle, the access to the data cache memory is completed.

Specifically, with respect to the second clock cycle, the TLB performs the linear address to physical address translation in the first half of the second cycle in a manner well-known in the art. The translation operation performed by the TLB will not be described further in detail. In addition to returning the physical address, the TLB returns status information based on the TLB translation (e.g., translation performed correctly) and the memory type. In one embodiment, the TLB indicates that the translation resulted in a fault, a page miss, a blocking condition or a valid linear address (e.g., translation performed correctly). The fault and miss indications are well known to those in the art and are not to be described in further detail herein. If the address cannot be translated, then a blocked status is generated by the TLB. For instance, in the present invention, a page miss may occur where the page miss handler is busy. In this case, the load operation must be halted, or blocked. Another example occurs when there is a linear address miss and a replacement in the TLB at the same time. Here, a blocked status is produced for the load operation. The specific conditions causing the TLB to generate a blocked status are dependent on the implementation of the paging system.

The memory type is also returned during the second cycle, along with the physical address. The different memory types include: normal cache speculative memory, uncacheable memory, non-speculative memory (e.g. memory mapped I/O). The speculative nature of the memory type depends on whether accesses to that location may be performed out-of-order. If so, then that location is speculative, while if not, then the location is non-speculative, such as in the case of a direct mapped I/O location. The different memory types are ascertained from a set of registers in the PMH that contain the memory type which are located according to the physical memory space as determined using the physical page address. The memory type for the load is stored in the TLB.

Besides the physical address, memory type and the TLB status, other signals are generated during the second cycle and received by the MOB. For instance, a MOB block signal is generated indicating that an address dependency exists. A linear address calculation fault indication signal is generated by the AGU and received by the MOB as well. The linear address calculation fault is generated as a result of a segment violation or other bus or dependent exception that indicates the linear address is invalid and has a fault.

Also during the second cycle, the data cache memory begins its access using the lower bits of the linear address. The bits utilized are that portion of the address that does not undergo the TLB translation. The remainder of the physical address is received fairly early from the TLB. The cache memory access continues into the third cycle. If a cache miss occurs, then potentially one of these two conditions may exist: a block or a squash. A block occurs, referred herein as a data cache memory block, when the cache memory is unable to buffer the load operation and blocks its completion. This is due to multiple memory operations already pending completion on the system bus. A data cache memory block condition may also be asserted for several other reasons. For instance, if there is a pending snoop to the cache line that is already being accessed at that time, then a data cache memory block condition exists. A squash, herein referred to as data cache memory squash, occurs if there is already an access to the same cache line. This provides a performance gain since a second bus request or buffer (e.g., queue 603 in FIG. 6) does not have to be allocated.

Also, in the third cycle, the MOB receives all the blocking information status signals and combines them to produce a load status. Also during the third cycle, the data cache memory completes its access and sends data to the load converter for its final conversion and writeback unless there is an earlier block or fault signal that aborts the cache memory access.

The status of the load operation is written into the load buffer. In one embodiment, the load status may be one of four designations: invalid, valid and completed, valid and blocked, or valid and not blocked. Each load gets written into its load buffer with the status and the load buffer uses these status bits to determine when the load operation is to execute in subsequent cycles. If there are no blocks or faults or other similar associated conditions/conflicts, then the load operation is sent to the data cache memory and assigned a load status of valid and completed. It should be noted that this does not necessarily mean that the load operation has been executed. With respect to writing back to the reservation station and ROB, the load operation has not completed (e.g., because there may have been a cache miss). From the MOB's standpoint, however, it is completed and no further action needs to be taken by the MOB. If a fault occurs with respect to the load operation, it is marked as valid and completed. Note that these faults may be indicated by the TLB or an AGU. The load may not have actually happened, but as far as the MOB is concerned the operation has been completed. If a page miss occurs with respect to the load operation, then the load operation is marked invalid. In the case of a page miss, the page miss handler processes a page walk and redispatches the load.

The valid and blocked and the valid and not blocked status are a function of multiple conditions and conflict determinations. The MOB, TLB and data cache memory provide the information to determine whether or not the status should be blocked or not. In one embodiment, these different conditions are prioritized to allow a general information field for determining when to redispatch a load operation.

Figure 11:
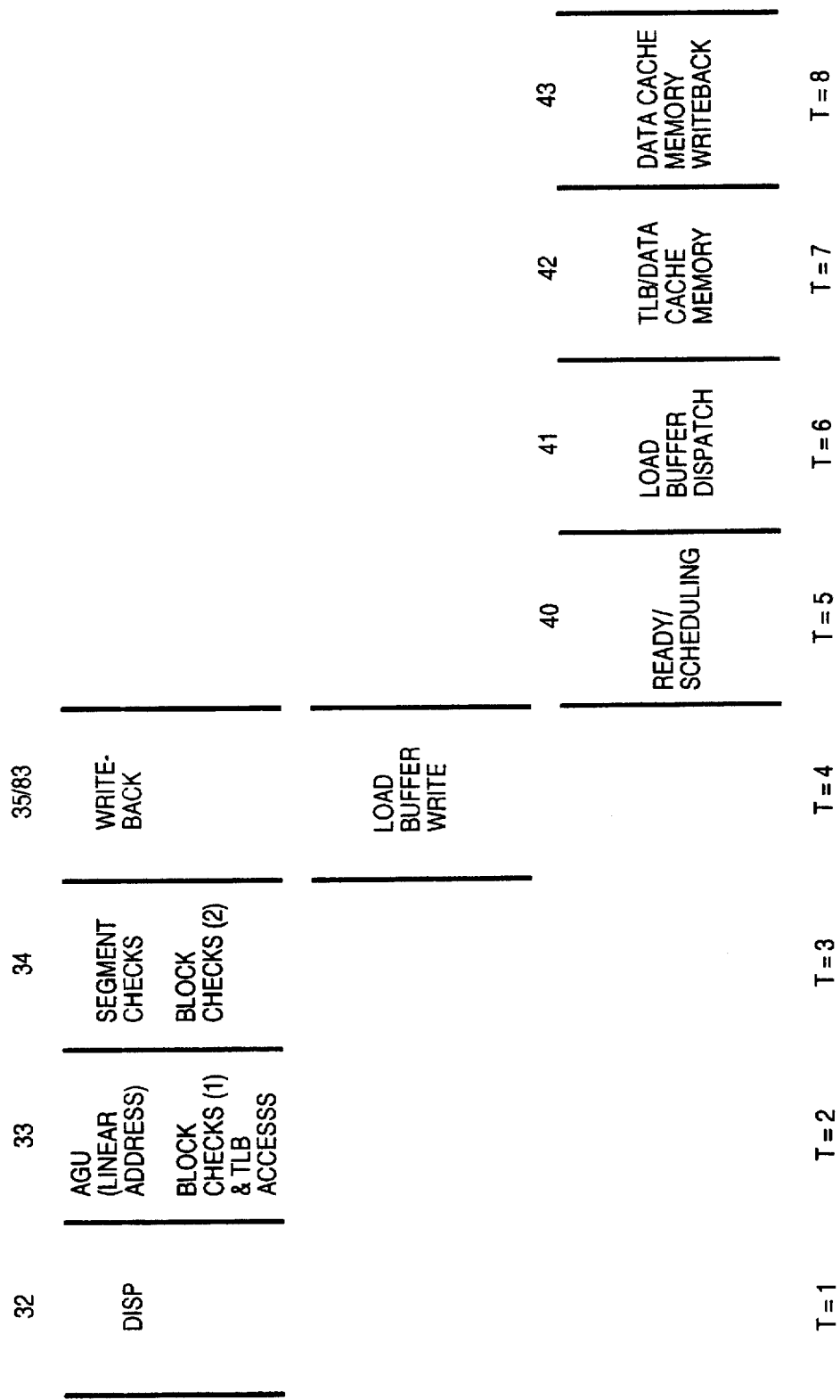
FIG. 11 illustrates the execution pipeline of a load operation.

One embodiment of the pipestages in the pipeline are shown in FIG. 11. Referring to FIG. 11, the execution of a load operation begins at pipestage 32 (t=1) with the dispatching of the load operation by the reservation station (RS). In one embodiment, the RS drives the microoperation code, a destination specifier, a memory buffer identification (ID) and address resources.

During the next pipestage 33 (t=2), the AGU calculates the linear address for the load operation. The computation of a linear address is well-known in the art. The present invention also performs one or more blocking checks to determine whether any address dependencies exist during pipestage 33. Note that the performance of these checks, or a portion thereof, may occur in other pipestages (e.g., pipestage 34). The present invention may check for resource dependencies in pipestage 33 as well.

In one embodiment, the present invention performs a check to determine if the load is a split access, referred to as a MOB split, and a check to determine if any store operations dispatched from the RS prior to the load operation has any invalid (e.g., unknown) destination address. This check is referred to herein as an unknown net check.

The MOB split information includes an indication of whether or not a load is accessing data across a 64-bit boundary, where each 64-bit boundary represents a separately addressable unit of a cache line (e.g., a chunk). The indicator may be one or more bits (e.g., a split bit) being set, the setting of a control register, or other mechanism to identify the existence of a split access. A data cache memory split access may also be identified. In one embodiment, split information may include an indication that the access is to data that crosses a cache line boundary. In the preferred embodiment, an access is also identified as a split access when the access crosses a 32 byte boundary.

In one embodiment, the unknown net check is performed by determining if the store buffer has any invalid STA entries that are older than the load that the RS dispatched. Since loads cannot be executed prior to stores with unknown address (to ensure proper memory ordering), this check is used to block a load until the STA has been dispatched from the RS.

The unknown net check uses the store color of the load operation and searches from the store address buffer tail pointer (i.e., the oldest micro-operation in the store buffer) to the STA pointed to by the store color of the load. If an entry has an invalid address, an unknown net hit is asserted with that SBID. The load buffer, which latched the load operation and split information during pipestage 33, tags the load with an STA block code having that SBID. This prevents the load from dispatching until the STA has been dispatched.

After calculating the linear address and performing the one or more address checks, the load operation undergoes segment checks during pipestage 34 (t=3). If the segment unit calculates a fault, a cancel indication (e.g., signal(s)) is generated. If such a cancel indication is generated, the AGU sends encoded fault information to the load buffer.

Also during pipestage 34, the load buffer latches all of the information computed and latched in pipestage 33 into a staging latch. The load buffer also stores the cancel and fault information, and returns it to the AGU when the load buffer redispatches the load. At that time, the AGU writes back to the ROB.

At pipestage 35 (t=4), the load buffer latches the information from the previous pipestage (34) into another staging latch. The load buffer then writes the load into the load buffer array. In one embodiment, the load will be in one of two states. The load will be marked at valid and not blocked if the load did not block. If the store address buffer reported an unknown net hit, then the load will be marked as valid and blocked on STA with a blocking ID equal to the unknown net SBID. If the load was determined to be a split access, then the load will be marked valid and blocked until the load operation is considered no longer speculative and the load operation will be redispatched.

A load operation that has been written into the load buffer is executed in a three cycle operation after initially being determined ready and scheduled for execution on the memory execution bus. The determination of whether a particular load operation is ready, and its scheduling for execution, occur during a pipestage 40 (t=5). Once scheduled, arbitration and dispatch to the memory execution bus occur during pipestage 41 (t=6). The DTLB operation and part of the data cache memory operation occur during pipestage 42 (t=7). The writeback of the data cache memory occurs during pipestage 43 (t=8).

The MOB schedules the load operations and dispatches them with the appropriate timing. In doing so, the MOB arbitrates for the use of the memory execution bus with the page miss handler and the data cache memory, both of which desire to use the bus to writeback and return data from an external memory, such as an L2 cache memory or system main memory. In one embodiment, the arbitration is handled by an arbitration mechanism in the MOB. Once the bus has been granted to the MOB, the scheduled load operation is dispatched to the TLB and the data cache memory.

For a particular load operation, pipestages 32–35 occur within four consecutive clock cycles. Similarly, pipeline stages 40–43 are performed in successive cycles. Pipeline stages 35 and 40 may or may not occur in successive cycles. Whether pipeline stages 35 and 40 occur in successive cycles depends on the current state of the load buffer and the presence of blocking conditions that exist immediately after pipeline stage 35 and prior to pipeline stage 40. For instance, if the load buffer determines that another load operation is ready for execution (e.g., no address or resource conflicts), that load operation is scheduled for execution in the memory subsystem and not the load currently entering pipestage 35. The same situation may exist in subsequent cycles where load operations stored in the load buffer that were dispatched by the reservation station prior to the load currently at pipeline stage 35 are scheduled for execution. In this case, the "older" load operation will be scheduled and executed. The order "ready" loads in the load buffer are dispatched is dependent on the scheduling protocol and mechanism. Furthermore, if a blocking condition exists on the load operation currently at pipeline stage 35, then the load may not be scheduled until the condition(s) causing the blocking to result no longer exist. This could be many cycles.

In any event, a minimum of eight cycles is required to execute a load operation. Executing a load operation in eight cycles does not generally hinder overall performance when the load buffer contains may load operations. However, situations do exist when a load operation is in one of the pipeline stages 32–35 and there are no other load operations being scheduled and dispatched from the load buffer and no other resources are requesting use of the memory execution bus (e.g., PMH and data cache memory). Situations also exist where operations are dispatched, which are intended for memory resources, yet do not require the use of the load buffer. In either case, executing a load or other operation must propagate through the various pipeline stages, while resources remain idle, until execution begins.

Load Operation Bypasses

The present invention provides a mechanism for performing a load operation utilizing the same pipeline stages as depicted in FIG. 11, yet with a reduced latency at certain times. The present invention provides a series of bypass mechanisms that allow a load to be dispatched to the memory execution unit earlier than waiting until after the load buffer array write. In one embodiment, the bypass mechanisms am implemented by overlapping the RS dispatch and load buffer array write pipeline (e.g., pipeline stages 32–35) with the memory execution pipeline (e.g., pipeline stages 41–43).

The present invention includes two types of bypasses. One of the bypasses is referred to herein as a MOB bypass and the other type of bypass is referred to herein as a staging latch dispatch. The MOB bypass uses a mechanism to bypass the operation dispatched from the RS directly into the memory execution unit one cycle following the RS dispatch (i.e., pipeline stage 32). There may be multiple RS staging dispatches that each allow the MOB to dispatch an operation originating from the RS a predetermined number of cycles following the RS dispatch, yet prior to (or concurrently with) the load buffer array write. In the preferred embodiment, there are two RS staging dispatches that dispatch an operation to the memory execution unit two or three cycles following the RS dispatch respectively.

MOB Bypass

An operation dispatched from the RS dispatch pipeline may be bypassed to the memory dispatch pipeline. In one embodiment, two types of operations may be bypassed from the RS dispatch pipeline after pipestage 32 to pipestage 41 of the memory dispatch pipeline. One type of operation are a set of operations that are not tracked by the load buffer and, thus, are dispatched immediately upon dispatch from the RS. In the preferred embodiment, if the operation is in one set of AGU operations, the MOB must bypass it. In the present invention, this type of operation that is bypassed includes AGU segment reads and writes, load linear address (e.g., computing and returning the linear address to the processor), control register read and write, TLB specific operations (e.g., loading a page entry), and floating point read ROM (e.g., reading the constant register file).

The other type of operation that may be bypassed are those operation, such as a normal load operation, that are executed in the memory pipeline. If the MOB encounters one of these second type of operations, the MOB may bypass the operation to pipestage 41 if the memory pipe (stage 41–43) is available.

It should be noted that in the present invention the determination of whether the memory pipe is available is determined according to a priority arbitration scheme. The operations being dispatched from the RS in pipestage 32, other than the AGU operations that must be bypassed, have the lowest priority. Therefore, a load operation dispatched by the RS in pipestage 32 has the lowest likelihood of being bypassed. Such a load operation would only be bypassed if no other previous operation stored in the load buffer, or otherwise currently in the memory pipe, is ready for execution. Although these operations have the lowest priority in one arbitration scheme, other priority schemes may provide different priorities to such operations, such that a load operation dispatched from the RS in pipestage 32 may be bypassed to the memory pipeline prior to other previously dispatched operations.

As shown in FIG. 12, during a MOB bypass, the MOB drives the memory execution bus with the operation information (e.g., op codes, etc.). This effectively overlaps the dispatch/MOB pipeline with the memory pipe. The bypass may be invalidated by an unknown net hit determined in a manner described above. In the preferred embodiment, pipestages 33–35 of the dispatch/MOB pipeline overlap pipestages 41–43 of the memory pipeline respectively. The operation is simultaneously executed on two pipelines. The information generated or determined during one of the pipestages 33–35 may be used during the pipestage it overlaps, as well as any subsequent pipestage. During stage 33/41, the linear address is bypassed directly from the AGU to the memory execution bus. During stage 34/42, the AGU fault information is directly bypassed to MOB cancellation hardware or logic. The MOB asserts a bypass indication (e.g., signal(s)), signaling the AGU that the operation has been bypassed and that the AGU must writeback to the ROB if the AGU generated an indication to cancel the operation due to an AGU fault.

The MOB performs full block checks on the load during stage 42. If the bypass was invalidated due to an unknown net hit, then the MOB array block checks may find the same condition, a different condition, or no condition. If the STA that caused the unknown net is the only outstanding STA in the store buffer, then the loosenet array checks will find the same blocking condition, and the load will be marked with an STA block. Similarly, due to different STA operations being executed, different blocking conditions, such as STD, STA or STORE, may also be asserted.

If the unknown net hit was asserted, the MOB asserts a MOB block indication (e.g., signal(s)), canceling the load operation. The loosenet array block may find a store between the STA that caused the unknown net hit and the load that can forward data. The MOB does not allow the data to be forwarded, because the bypass was invalidated, so the load cannot complete. If the load faulted due to the AGU or TLB and there was an unknown net hit, the MOB does not allow the load to be completed, because the bypass was invalidated. The AGU or TLB cannot writeback fault information and the load buffer redispatches these operations. In either of these cases, the MOB produces a block code of NONE for the load so that it may be marked ready for execution in the next cycle.

FIG. 13 illustrates a boundary case between the unknown net and MOB block checks during a MOB bypass. The load is blocked due to an unknown net hit of a STA operation that writes into the store buffer array during the same clock as the unknown net check is performed. The STA write is too late for the check because the check occurs during the high phase of the clock and the array write occurs during the low phase of the clock. Therefore, the loosenet array check uses the STA write information that the unknown net missed. This may result in a false block if the STA is completely unrelated to the load. The MOB still asserts a MOB block indication in this case because the bypass was invalidated. The data cache memory aborts the operation and the load buffer redispatches the operation.

Also note that in the present invention during the MOB bypass, the load buffer performs the stage 35 array write and the stage 43 array write at the same time to the same entry in the load buffer. Most fields are only written by one of the two array writes, however, several are written by both array writes. In addition, some fields are set or cleared by events within the array. In one embodiment, the stage 43 write takes precedence over the stage 35 write for the MOB bypass case.

In the present invention the MOB bypass reduces the latency from eight cycles to four cycles. The reduction in latency results in increased performance.

Using only the MOB bypass, the load has the potential to dispatch at one of two stages, i.e., the operation can dispatch at stage 33 if the MOB bypass is used or at stage 41. If the MOB bypass is not used, the earliest an operation can dispatch to the memory pipe is later at stage 41 after it has written into the load buffer array, ready scheduling has been performed and the MOB has dispatched the operation from the load buffer. To compensate for situations when the memory pipe may be available other than at the time of the MOB bypass or before a load has been written into the load buffer, the present invention also includes facilities to dispatch operations to the memory pipeline between these two time periods. In one embodiment, a load operation is able to dispatch in the second and third clock cycles after RS dispatch (if it didn't get bypassed initially). These are referred to as staging latch dispatches.

Staging Latch Dispatches

RS staging latch dispatches provide extra paths by which operations may be driven onto the memory execution bus. In the preferred embodiment, an operation may be dispatched to the memory execution unit from either of two staging latches.

The first of the two RS staging latch dispatches is referred to as the RS stage 34 staging latch dispatch. A load may dispatch from the RS stage 34 staging latch if there is no unknown net hit, no retirement block (e.g., no MOB split), no MOB bypass and the memory pipe is available. The two pipelines operate in the same manner as described above, except where the two pipelines interact. The interaction of the two pipelines during a RS stage 34 staging latch dispatch is shown in FIG. 14. The operation information is sent from the staging latch to the memory execution bus in pipestage 41. During stage 42, the latched AGU cancel information is sent directly to the MOB to cancel the operation (if appropriate). In stage 35, the load buffer write is performed.

The second of the two RS staging latch dispatches is referred to as the RS stage 35 staging latch dispatch. A load may dispatch from the RS stage 35 staging latch if there is no unknown net hit, no retirement block (e.g., MOB split), no MOB bypass, the operation did not dispatch from the stage 34 staging latch, and the memory pipe is available. FIG. 15 illustrates the interaction of the two pipelines during an RS stage 35 staging latch dispatch. The operation information is sent from staging latch 35 to the memory execution bus in pipestage 41. During stage 42, the twice latched AGU cancel information is sent directly to the MOB. In stage 35, the load buffer array write is done.

The load buffer internally arbitrates for the RS staging dispatches. The load buffer staging latches have a higher priority than a MOB bypass, but lower priority than load buffer array dispatches. In one embodiment, the priority is (listed from highest to lowest priority):

Load buffer Latch Dispatch (from array read)

RS stage 35 staging latch

RS stage 34 staging latch

If the load buffer has at least one of these sources of operations valid, it asserts a request for the memory pipe. This priority is based so that "older" operations, with respect to when they are dispatched from the RS, have the highest priority.

An example of the RS staging latch dispatches is shown in FIG. 16. During the first pipestage (32), a load operation A is not bypassed from the MOB. This may be due to a load buffer array dispatch that was allowed to proceed during the clock cycle, such as shown as load operation B. However, at the next clock cycle (t=2, pipestage 33), where the load operation A has been staged along to write into the array, all the information needed to initially send the load to the memory pipe is available. During this clock cycle, assuming the priority arbitration permits, the load operation A may be dispatched (shown as $A_1$). Similarly, if the load is staged for two clocks, and priority arbitration permits, the load operation may be dispatched in the third clock cycle (t=3) as a staging latch 35 dispatch (shown as $A_2$). Therefore, in one embodiment, a load operation is able to be dispatched during any of the first three clock cycles. The present invention may allow a load to be dispatched in the fourth pipestage as well. However, at such a time, the load has already in the load buffer array and is undergoing ready scheduling. Therefore, if a dispatch were to be made, a conflict would exist with the ready scheduling hardware that is associated with a load buffer dispatch. Therefore, steps must be taken to ensure that such a conflict does not occur or that the load buffer is able to recognize the occurrence of a dispatch and exclude such a dispatched load operation from any ready scheduling being performed.

In the present invention, an arbitration scheme is implemented to recognize RS dispatched operations and prioritize them to determine when dispatches may occur. In one embodiment, an operation dispatched from the RS has the lowest priority except when one of the specifically designated AGU operations is dispatched from the RS. In this case, they have the highest priority.

The priority utilized in one embodiment of the present invention is as follows:

specially designated AGU operation the data cache memory (or the L2 cache memory)

the page miss handler the load buffer of the MOB staging latch 35 staging latch 34

MOB bypass

However, if the bypass is a specially designated µop, they are at the top of the priority.

FIG. 17 illustrates the bypassing hardware of the present invention. Referring to FIG. 17, reservation station 305 is shown coupled to the input of the MOB 503. The input MOB 503 is coupled to latch 701 and AGU 505. The outputs of latch 1701 and AGU 505 are coupled to the inputs of staging latch 34 and coupled to one input of MUX 1702. The output of staging latch 34 and the output of AGU 505 are also coupled to the inputs of staging latch 35. The output of staging latch 34 is also coupled to one input of MUX 1702. The output of the staging latch 35 is coupled to another input of the MUX 1702. The output of the staging latch 35 is also coupled to the load buffer array. Another input of the MUX 1702 is coupled to the latched load buffer read candidate 1703. Load buffer read candidate 1703 is output from the load buffer array 901. A control input into MUX 1702 is coupled to a dispatch select (Disp. Sel.) output 1704 of the arbitration logic 1705. The output of MUX 1702 is coupled to the driver 1706, which is coupled to the memory execution unit bus 1707. Driver 1706 is a tri-state driver which is coupled to receive a MOB grant signal 1708 from the arbitration logic 1705. Also coupled to the memory execution unit bus 1707 is a tri-state driver 1709 for the page miss handler 501. Driver 1709 also receives a page miss handler grant 1710 from the arbitration logic 1705. A data cache memory (not shown) also sits on the memory execution unit bus 1707 and uses a driver (not shown) that is selected by a data cache unit grant 1711 from the arbitration logic 1705.

The inputs to arbitration logic 1705 include signals that allow the arbitration logic 1705 to determine priority for the memory execution bus 1707. In one embodiment, the inputs in arbitration logic 1705 include an unknown net and split access indication signal, an indication that the RS dispatched an operation that must be bypassed (e.g., an AGU operation), the new operation dispatched from the RS, a data cache memory request, a page miss handler request and a load buffer array read request.

The arbitration logic 1705 of the present invention grants ownership of the memory execution bus 1707 according to a priority scheme. In one embodiment, the priority specified above is used to grant ownership of memory execution bus 1707. It should be noted that other priority schemes may be used and implemented in the present invention.

According to the priority utilized, arbitration logic 1705 produces either a data cache memory grant 1711, a MOB grant 1708 or a PMH grant 1710, thereby allowing the winner of the arbitration to gain access to the memory execution bus 1707. In the situation where the MOB grant 1708 is generated, thereby allowing the MOB to gain ownership of the bus, the arbitration logic 1705 also outputs the dispatch select signal 1704 to select which of the inputs to MUX 1702 is driven onto the memory execution bus 1707. According to the signals received, arbitration logic 1705 can select either the MOB bypass, staging latch 34 dispatch, the staging latch 35 dispatch, or a load operation dispatched from the load buffer array.

FIG. 18 is a timing diagram illustrating the MOB bypassing and memory system execution of a RS dispatch. The arbitration for the memory pipe was granted to the bypassing operation and the data cache memory completes the load by asserting the writeback valid. The RS load dispatch execution begins by the RS dispatching the op code to the AGU and the MOB. The AGU produces the operation valid bit from the bypass MUXs. Then the MOB arbitrates internally and bypasses the RS operation information latched from clock 1 and the AGU linear address. This information is driven by the MOB on the memory execution bus. A valid operation indication is sent to the reservation station and the ROB schedules the writeback in clock 4.

The AGU computes the cancel and fault information from the linear address and op code. The MOB signals the AGU that the operation is bypassed and the AGU can drive the WB bus in case of a fault. The MOB does blocking checks and does not block the operation going to the data cache memory. Finally, the data cache unit returns the writeback valid and the load converter converts and drives the data cache unit data to the ROB and the RS.

Whereas many alterations and modifications of the present invention will no doubt become apparent to a person of ordinary skill in the art after having read the foregoing description, it is to be understood that the particular embodiment shown and described by way of illustration is in no way to be considered limiting. Therefore, references to details of the preferred embodiment are not intended to limit the scope of the claims which in themselves recite only those features regarded as essential to the invention.

Thus, a method and apparatus for bypassing memory operations to a memory execution pipeline has been described.

We claim:

1. A method for executing a load operation in a computer system having a processor that includes a load buffer to store a plurality of load operations previously dispatched for execution to memory, a dispatch and load buffer write pipeline to dispatch a load operation to a memory execution unit and to eventually store the load operation in the load buffer in a first plurality of stages and a memory execution pipeline to determine readiness of the load operation, to schedule execution of the load operation and to execute the load operation in a second plurality of stages, said method comprising the steps of:

dispatching the load operation to the memory execution unit to begin execution of the load operation in the dispatch and load buffer write pipeline; and bypassing the load operation to the memory execution pipeline for execution therein while the dispatch and load buffer write pipeline continues operating on the load operation, the step of bypassing occurring in a clock cycle subsequent to the dispatching of the load operation and prior to the load operation being written into the load buffer, such that operation of both the dispatch and load buffer write pipeline and the memory execution pipeline on the load operation is overlapped.

2. The method defined in claim 1 wherein step of bypassing occurs in the clock cycle immediately following the load operation being dispatched.

3. The method defined in claim 2 wherein the load operation is bypassed if the load operation is one of a predetermined number of operations.

4. The method defined in claim 3 wherein the predetermined number of operations includes an AGU operation.

5. The method defined in claim 2 wherein the load operation is bypassed when the memory execution pipeline is available and no other previously dispatched operation is ready to use the memory execution pipeline.

6. The method defined in claim 1 wherein the step of bypassing occurs two clock cycles following the load operation being dispatched.

7. The method defined in claim 6 wherein the load operation is bypassed when the memory execution pipeline is available and no other previously dispatched operation is ready to use the memory execution pipeline and the load operation was not dispatched to memory in a preceding clock cycle.

8. The method defined in claim 1 wherein the step of bypassing occurs three clock cycles following the load operation being dispatched.

9. The method defined in claim 8 wherein the load operation is bypassed when the memory execution pipeline is available and no other previously dispatched operation is ready to use the memory execution pipeline and the load operation was not dispatched to memory in a preceding clock cycle.

10. The method defined in claim 1 wherein the step of bypassing occurs one clock cycle prior to buffering the load operation in the load buffer when a dependency prevents the load operation from being performed.

11. A method for executing a load operation in a computer system having a processor that includes a load buffer to store a plurality of load operations previously dispatched for execution to memory, a dispatch and load buffer write pipeline to dispatch a load operation to a memory execution unit and to eventually store the load operation in the load buffer in a first plurality of stages and a memory execution pipeline to determine readiness of the load operation, to schedule execution of the load operation and to execute the load operation in a second plurality of stages, said method comprising the steps of:

dispatching the load operation to the memory execution unit to begin execution of the load operation in the dispatch and load buffer write pipeline; and bypassing the load operation to the memory execution pipeline for execution therein while the dispatch and preload buffer write pipeline continues operating on the load operation, the step of bypassing occurring in a clock cycle immediately subsequent to the dispatching of the load operation and prior to the load operation being written into the load buffer when the memory execution pipeline is available, and no other previously dispatched operation is ready to use the memory execution pipeline or when the load operation comprises one of a predetermined number of operations, such that operation of both the dispatch and load buffer write pipeline and the memory execution pipeline on the load operation is overlapped.

12. The method defined in claim 11 further comprising the step of bypassing the load operation two clock cycles following the load operation being dispatched if the memory execution pipeline is available and no other previously dispatched operation is ready to use the memory execution pipeline and the load operation was not dispatched to memory in a preceding clock cycle.

13. The method defined in claim 12 further comprising the step of bypassing the load operation three clock cycles following the load operation being dispatched if the memory execution pipeline is available and no other previously dispatched operation is ready to use the memory execution pipeline and the load operation was not dispatched to memory in either of the two preceding clock cycles.

14. The method defined in claim 11 wherein the predetermined number of operations includes an AGU operation.

15. The method defined in claim 11 further comprising the step of bypassing the load operation three clock cycles following the load operation being dispatched if the memory execution pipeline is available and no other previously dispatched operation is ready to use the memory execution pipeline and the load operation was not dispatched to memory in either of the two preceding clock cycles.

16. A processor comprising:
an issue unit
a memory execution unit coupled to the issue unit, wherein said memory execution unit comprises a load buffer to store a plurality of currently pending load operating that were previously dispatched for execution to memory, a dispatch and load buffer write pipeline having a first plurality of stages to dispatch a load operation to the memory execution unit and to eventually store the load operation in the load buffer, a memory execution pipeline to determine readiness of the load operation, to schedule execution of the load operation and to execute the load operation in a second plurality of stages, and a bypass mechanism to bypass the load operation from the dispatch and load buffer write pipeline to the memory execution pipeline, for execution therein while the dispatch and load buffer write pipeline continues operating on the load operation, during a clock cycle subsequent to the load operation being dispatched, such that operation of both the dispatch and load buffer write pipeline and the memory execution pipeline on the load operation is overlapped.

17. The processor defined in claim 16 wherein the bypass mechanism bypasses the load operation in the clock cycle immediately following the load operation being dispatched to the memory execution unit.

18. The processor defined in claim 17 wherein the bypass mechanism bypasses the load operation if the load operation is one of a predetermined number of operations.

19. The processor defined in claim 18 wherein the predetermined number of operations includes an AGU operation.

20. The processor defined in claim 16 wherein the bypass mechanism bypasses the load operation if the memory execution pipeline is available and no other previously dispatched operation is ready to use the memory execution pipeline.

21. The processor defined in claim 16 wherein the bypass mechanism bypasses the load operation two clock cycles following the load operation being dispatched to the memory execution unit.

22. The processor defined in claim 21 wherein the bypass mechanism bypasses the load operation if the memory execution pipeline is available, no other previously dispatched operation is ready to use the memory execution pipeline and the load operation was not dispatched to memory in a preceding clock cycle.

23. The processor defined in claim 16 wherein the bypass mechanism bypasses the load operation three clock cycles following the load operation being dispatched to the memory execution unit.

24. The processor defined in claim 23 wherein the bypass mechanism bypasses the load operation if the memory execution pipeline is available, no other previously dispatched operation is ready to use the memory execution pipeline and the load operation was not dispatched to memory in a preceding clock cycle.

25. The processor defined in claim 16 wherein the bypass mechanism bypasses the load operation one clock cycle prior to buffering the load operation in the load buffer when a dependency prevents the load operation from being performed.

26. A processor comprising:
an issue unit
a memory execution unit coupled to the issue unit, wherein said memory execution unit comprises
a load buffer to store a plurality of currently pending load operations that were previously dispatched for execution to memory, a dispatch and load buffer write pipeline having a first plurality of stages to dispatch a load operation to a memory execution unit and to eventually store the load operation in the load buffer, a memory execution pipeline to determine readiness of the load operation, to schedule execution of the load operation and to execute the load operation in a second plurality of stages; and a bypass mechanism coupled to the dispatch and load buffer write pipeline and the memory execution pipeline, wherein the bypass mechanism bypasses the load operation from the dispatch and load buffer write pipeline to the memory execution pipeline, for execution therein while the dispatch and load buffer write pipeline continues operating on the load operation, during a clock cycle subsequent to the load operation being dispatched to the memory execution unit, such that operation of both the dispatch and load buffer write pipeline and the memory execution pipeline on the load operation is overlapped;

wherein the bypass mechanism comprises a first bypass and a second bypass, wherein the first bypass bypasses the load operation in a first clock cycle immediately following the load operation being dispatched to the memory execution unit and wherein the second bypass bypasses the load operation in a clock cycle subsequent to the first clock cycle.

27. The processor defined in claim 26 wherein the first bypass mechanism bypasses the load operation if the load operation is one of a predetermined number of operations.

28. The processor defined in claim 27 wherein the predetermined number of operations includes an AGU operation.

29. The processor defined in claim 26 wherein the first bypass bypasses the load operation if the memory execution pipeline is available and no other previously dispatched operation is ready to use the memory execution pipeline.

30. The processor defined in claim 26 wherein the second bypass bypasses the load operation two clock cycles following the load operation being dispatched to the memory execution unit.

31. The processor defined in claim 26 wherein the second bypass bypasses the load operation if the memory execution pipeline is available, no other previously dispatched operation is ready to use the memory execution pipeline and the load operation was not dispatched to memory in a preceding clock cycle.

32. The processor defined in claim 26 wherein the second bypass bypasses the load operation three clock cycles following the load operation being dispatched to the memory execution unit.

33. The processor defined in claim 26 wherein the second bypass bypasses the load operation one clock cycle prior to buffering the load operation in the load buffer when a dependency prevents the load operation from being performed.

34. A processor comprising:

a memory order buffer having a load buffer;

a reservation station dispatch and load buffer write means for dispatching a load operation to a memory order buffer and for storing the load operation in the load buffer therein;

a memory dispatch means for dispatching the load operation to memory; and a bypass means for bypassing the load operation from the reservation station dispatch and load buffer write means to the memory dispatch means for execution therein while the dispatch and load buffer write means continues operating on the load operation, such that operation of both the dispatch and load buffer write means and the memory dispatch means on the load operation is overlapped.

* * * * *